US011710391B2

(12) United States Patent
Connell, II et al.

(10) Patent No.: US 11,710,391 B2
(45) Date of Patent: Jul. 25, 2023

(54) GUNSHOT DETECTION SYSTEM WITH FORENSIC DATA RETENTION, LIVE AUDIO MONITORING, AND TWO-WAY COMMUNICATION

(71) Applicant: Johnson Controls Fire Protection LP, Boca Raton, FL (US)

(72) Inventors: Thomas Wysong Connell, II, Westminster, MA (US); Alan Levin, III, Bolton, MA (US)

(73) Assignee: Johnson Controls Fire Protection LP, Boca Raton, FL (US)

( * ) Notice: Subject to any disclaimer, the term of this patent is extended or adjusted under 35 U.S.C. 154(b) by 0 days.

(21) Appl. No.: 17/491,562

(22) Filed: Oct. 1, 2021

(65) Prior Publication Data

US 2022/0044532 A1 Feb. 10, 2022

Related U.S. Application Data

(62) Division of application No. 16/968,931, filed as application No. PCT/IB2019/051202 on Feb. 14, 2019, now Pat. No. 11,170,619.

(Continued)

(51) Int. Cl.
*G08B 13/16* (2006.01)
*G06F 16/61* (2019.01)
(Continued)

(52) U.S. Cl.
CPC ......... *G08B 13/1672* (2013.01); *G06F 16/61* (2019.01); *G06F 21/602* (2013.01);
(Continued)

(58) Field of Classification Search
CPC .... G08B 13/1672; G08B 17/00; G08B 19/00; G08B 25/014; G06F 16/61; G06Q 50/265
See application file for complete search history.

(56) References Cited

U.S. PATENT DOCUMENTS 4,709,330 A 11/1987 Yokoi et al.
5,504,717 A 4/1996 Sharkey et al.
(Continued)

FOREIGN PATENT DOCUMENTS

CN 102 843 205 B 12/2012
EP 1 806 952 A2 7/2007
(Continued)

OTHER PUBLICATIONS

International Search Report and Written Opinion of the International Searching Authority, dated Jun. 18, 2019, from International Application No. PCT/IB2019/051202, filed on Feb. 14, 2019. 24 pages.

(Continued)

*Primary Examiner* — John A Tweel, Jr.
(74) *Attorney, Agent, or Firm* — HoustonHogle LLP

(57) ABSTRACT

A gunshot detection system includes gunshot sensor units with microphones for detecting gunshots and capturing audio data depicting the detected gunshots and other ambient sounds, an environmental board with various environmental sensors for generating environmental data indicating environmental conditions. The audio data, environmental data, and position information can be stored locally on local nonvolatile storage of the gunshot sensor unit for later retrieval by law enforcement entities. In one embodiment, the gunshot sensor units include a wired and/or wireless data transfer interface for transferring the audio data, environmental data and/or position information to handheld units of law enforcement entities. The gunshot sensor unit can also stream live captured audio data for live monitoring by a control panel, and might also include speakers for providing audio playback of audio data from the control panel.

17 Claims, 14 Drawing Sheets

Related U.S. Application Data

(60) Provisional application No. 62/637,161, filed on Mar. 1, 2018, provisional application No. 62/631,296, filed on Feb. 15, 2018.

(51) Int. Cl.

| | | |
|---|---|---|
| *G08B 19/00* | (2006.01) | |
| *G08B 17/06* | (2006.01) | |
| *G08B 25/10* | (2006.01) | |
| *G08B 25/14* | (2006.01) | |
| *H04L 41/06* | (2022.01) | |
| *G08B 17/00* | (2006.01) | |
| *G08B 29/18* | (2006.01) | |
| *G08B 29/24* | (2006.01) | |
| *H04W 12/037* | (2021.01) | |
| *G06F 21/60* | (2013.01) | |
| *G06Q 50/26* | (2012.01) | |
| *H04L 9/08* | (2006.01) | |
| *H04L 9/14* | (2006.01) | |
| *H04W 56/00* | (2009.01) | |
| *G08B 25/04* | (2006.01) | |
| *G07C 9/00* | (2020.01) | |
| *G08B 7/06* | (2006.01) | |
| *G08B 25/01* | (2006.01) | |
| *H04W 4/029* | (2018.01) | |
| *H04W 4/38* | (2018.01) | |
| *H04W 4/90* | (2018.01) | |
| *H04W 84/18* | (2009.01) | |
| *H04W 84/20* | (2009.01) | |

(52) U.S. Cl.
CPC ....... *G06Q 50/265* (2013.01); *G07C 9/00182* (2013.01); *G08B 7/066* (2013.01); *G08B 17/00* (2013.01); *G08B 17/06* (2013.01); *G08B 19/00* (2013.01); *G08B 25/014* (2013.01); *G08B 25/04* (2013.01); *G08B 25/10* (2013.01); *G08B 25/14* (2013.01); *G08B 29/188* (2013.01); *G08B 29/24* (2013.01); *H04L 9/0894* (2013.01); *H04L 9/14* (2013.01); *H04L 41/06* (2013.01); *H04W 4/029* (2018.02); *H04W 4/38* (2018.02); *H04W 4/90* (2018.02); *H04W 12/037* (2021.01); *H04W 56/0015* (2013.01); *H04W 84/18* (2013.01); *H04W 84/20* (2013.01)

(56) References Cited

U.S. PATENT DOCUMENTS

| | | | |
|---|---|---|---|
| 5,973,998 A | 10/1999 | Showen et al. | |
| 6,552,963 B2 | 4/2003 | Baranek et al. | |
| 6,970,183 B1 | 11/2005 | Monroe | |
| 7,228,429 B2 | 6/2007 | Monroe | |
| 7,411,865 B2 | 8/2008 | Calhoun | |
| 7,460,006 B2 | 12/2008 | Kates | |
| 7,676,194 B2 | 3/2010 | Rappaport | |
| 7,843,356 B2 | 11/2010 | Webb | |
| 7,986,231 B1 | 7/2011 | Bentley et al. | |
| 8,149,649 B1 | 4/2012 | Brinn et al. | |
| 8,589,994 B2* | 11/2013 | Monroe | H04B 7/18504 340/963 |
| 8,806,632 B2 | 8/2014 | Stefanidakis et al. | |
| 9,432,720 B2 | 8/2016 | Kruglick | |
| 9,642,131 B2* | 5/2017 | Bohlander | A61B 5/08 |
| 9,672,700 B2 | 6/2017 | Lax | |
| 9,672,727 B1 | 6/2017 | Alexander et al. | |
| 9,679,459 B2 | 6/2017 | Crowe | |
| 9,830,932 B1 | 11/2017 | Gunderson et al. | |
| 9,875,643 B1 | 1/2018 | Sarna, II | |
| 9,888,371 B1 | 2/2018 | Jacob | |
| 10,089,845 B2 | 10/2018 | Skorpik et al. | |
| 10,102,732 B2 | 10/2018 | Gersten | |
| 10,586,109 B1 | 3/2020 | Fowler et al. | |
| 10,657,800 B1 | 5/2020 | Fowler et al. | |
| 10,741,058 B1 | 8/2020 | Miller | |
| 10,928,244 B2 | 2/2021 | Warren et al. | |
| 11,133,021 B2* | 9/2021 | Davis | G08B 13/1672 |
| 11,170,619 B2 | 11/2021 | Connell, II et al. | |
| 11,282,536 B2* | 3/2022 | Davis | G08B 13/1672 |
| 2006/0109113 A1 | 5/2006 | Reyes et al. | |
| 2008/0165621 A1 | 7/2008 | Fisher et al. | |
| 2010/0142715 A1* | 6/2010 | Goldstein | G06F 16/68 707/769 |
| 2010/0271905 A1 | 10/2010 | Khan et al. | |
| 2010/0305778 A1 | 12/2010 | Dorneich et al. | |
| 2011/0169633 A1 | 7/2011 | Lauder et al. | |
| 2014/0218518 A1 | 8/2014 | Oliver | |
| 2014/0269199 A1 | 9/2014 | Weldon et al. | |
| 2014/0277609 A1 | 9/2014 | Nye et al. | |
| 2014/0327543 A1 | 11/2014 | Showen et al. | |
| 2014/0340222 A1 | 11/2014 | Thornton et al. | |
| 2015/0061869 A1 | 3/2015 | Crowe et al. | |
| 2015/0070166 A1 | 3/2015 | Boyden et al. | |
| 2015/0077550 A1 | 3/2015 | Apelbaum et al. | |
| 2015/0339913 A1 | 11/2015 | Lyman et al. | |
| 2015/0347079 A1 | 12/2015 | Price et al. | |
| 2016/0232774 A1 | 8/2016 | Noland et al. | |
| 2016/0260307 A1 | 9/2016 | Skorpik et al. | |
| 2016/0269397 A1 | 9/2016 | Camenisch et al. | |
| 2016/0379456 A1 | 12/2016 | Nongpiur et al. | |
| 2017/0019264 A1 | 1/2017 | Nugent et al. | |
| 2017/0045336 A1 | 2/2017 | Crowe et al. | |
| 2017/0069190 A1 | 3/2017 | Hansen et al. | |
| 2017/0103643 A1 | 4/2017 | Powers, III et al. | |
| 2017/0169686 A1 | 6/2017 | Skorpik et al. | |
| 2017/0289650 A1 | 10/2017 | Schattmaier et al. | |
| 2017/0301220 A1 | 10/2017 | Jarrell et al. | |
| 2018/0053394 A1 | 2/2018 | Gersten | |
| 2018/0122030 A1 | 5/2018 | Raz et al. | |
| 2018/0160278 A1 | 6/2018 | Patel et al. | |
| 2018/0199179 A1 | 7/2018 | Rauner | |
| 2018/0308475 A1 | 10/2018 | Locke et al. | |
| 2019/0024918 A1 | 1/2019 | Brissette et al. | |
| 2019/0130723 A1 | 5/2019 | Thiel et al. | |
| 2019/0213901 A1 | 7/2019 | Kur et al. | |
| 2019/0347920 A1 | 11/2019 | Anderson et al. | |
| 2021/0158837 A1 | 5/2021 | Saki et al. | |
| 2021/0202067 A1 | 7/2021 | Williams et al. | |

FOREIGN PATENT DOCUMENTS

| | | |
|---|---|---|
| EP | 3032508 A1 | 6/2016 |
| JP | 2001236822 A | 8/2001 |
| JP | 4973380 B2 | 7/2012 |
| WO | WO 9110980 | 7/1991 |
| WO | WO 2010039130 | 4/2010 |
| WO | WO 2010111556 | 9/2010 |
| WO | WO 2011134371 | 11/2011 |
| WO | WO 2012092562 | 7/2012 |
| WO | WO 2017070741 | 5/2017 |
| WO | WO 2017122119 | 7/2017 |
| WO | WO 2017520831 | 7/2017 |
| WO | WO 2018044553 | 3/2018 |
| WO | WO 2018044556 | 3/2018 |
| WO | WO 2018185723 | 10/2018 |
| WO | WO 2019159098 | 8/2019 |
| WO | WO 2019159099 | 8/2019 |
| WO | WO 2019159100 | 8/2019 |
| WO | WO 2019159101 | 8/2019 |
| WO | WO 2019159102 | 8/2019 |
| WO | WO 2019159103 | 8/2019 |
| WO | WO 2019159104 | 8/2019 |

(56) References Cited

FOREIGN PATENT DOCUMENTS

| | | |
|---|---|---|
| WO | WO 2019159105 | 8/2019 |
| WO | WO 2019159106 | 8/2019 |

OTHER PUBLICATIONS

International Search Report and Written Opinion of the International Searching Authority, dated May 21, 2019, from International Application No. PCT/IB2019/051203, filed on Feb. 14, 2019. 13 pages.

International Search Report and Written Opinion of the International Searching Authority, dated May 14, 2019, from International Application No. PCT/IB2019/051204, filed on Feb. 14, 2019. 15 pages.

International Search Report and Written Opinion of the International Searching Authority, dated Jul. 12, 2019, from International Application No. PCT/IB2019/051205, filed on Feb. 14, 2019. 23 pages.

International Search Report and Written Opinion of the International Searching Authority, dated Jun. 12, 2019, from International Application No. PCT/IB2019/051206, filed on Feb. 14, 2019. 13 pages.

International Search Report and Written Opinion of the International Searching Authority, dated Jun. 14, 2019, from International Application No. PCT/IB2019/051207, filed on Feb. 14, 2019. 13 pages.

International Search Report and Written Opinion of the International Searching Authority, dated May 31, 2019, from International Application No. PCT/IB2019/051208, filed on Feb. 14, 2019. 18 pages.

International Search Report and Written Opinion of the International Searching Authority, dated Jul. 23, 2019, from International Application No. PCT/IB2019/051209, filed on Feb. 14, 2019. 20 pages.

International Search Report and Written Opinion of the International Searching Authority, dated May 24, 2019, from International Application No. PCT/IB2019/051210, filed on Feb. 14, 2019. 15 pages.

Partial Search Report dated Apr. 24, 2019, from International Application No. PCT/IB2019/051202, filed on Feb. 14, 2019. 14 pages.

Partial Search Report dated May 17, 2019, from International Application No. PCT/IB2019/051205, filed on Feb. 14, 2019. 13 pages.

Partial Search Report dated May 31, 2019, from International Application No. PCT/IB2019/051209, filed on Feb. 14, 2019. 12 pages.

International Preliminary Report on Patentability dated Aug. 27, 2020 from International Application No. PCT/IB2019/051202, filed on Feb. 14, 2019. 14 pages.

International Preliminary Report on Patentability dated Aug. 27, 2020, from International Application No. PCT/IB2019/051203, filed on Feb. 14, 2019. 7 pages.

International Preliminary Report on Patentability dated Aug. 27, 2020, from International Application No. PCT/IB2019/051204, filed on Feb. 14, 2019. 9 pages.

International Preliminary Report on Patentability dated Aug. 27, 2020, from International Application No. PCT/IB2019/051205, filed on Feb. 14, 2019. 23 pages.

International Preliminary Report on Patentability dated Aug. 27, 2020, from International Application No. PCT/IB2019/051206, filed on Feb. 14, 2019. 8 pages.

International Preliminary Report on Patentability dated Aug. 27, 2020, from International Application No. PCT/IB2019/051207, filed on Feb. 14, 2019. 8 pages.

International Preliminary Report on Patentability dated Aug. 27, 2020, from International Application No. PCT/IB2019/051208, filed on Feb. 14, 2019. 12 pages.

International Preliminary Report on Patentability dated Aug. 27, 2020, from International Application No. PCT/IB2019/051209, filed on Feb. 14, 2019. 12 pages.

International Preliminary Report on Patentability dated Aug. 27, 2020, from International Application No. PCT/IB2019/051210, filed on Feb. 14, 2019. 9 pages.

Examination Report dated Oct. 10, 2022 from EP Application No. 19 707 130.1, filed on Feb. 14, 2019. 7 pages.

Examination Report dated Nov. 2, 2022, from EP Application No. 19 711 166.9, filed on Feb. 14, 2019. 10 pages.

Examination Report dated Oct. 26, 2022, from EP Application No. 19 711 167.7, filed on Feb. 14, 2019. 9 pages.

Examination Report dated Oct. 14, 2022, from EP Application No. 19 710 785.7, filed on Feb. 14, 2019. 9 pages.

Examination Report dated Oct. 21, 2022, from EP Application No. 19 711 419.2, filed on Feb. 14, 2019. 9 pages.

Examination Report dated Oct. 20, 2022, from EP Application No. 19 711 420.0, filed on Feb. 14, 2019. 9 pages.

Examination Report dated Oct. 14, 2022, from EP Application No. 19 711 168.5, filed on Feb. 14, 2019. 6 pages.

Examination Report dated Oct. 25, 2022, from EP Application No. 19 710 786.5, filed on Feb. 14, 2019. 9 pages.

McIntire, J., et al., "AFRL Commander's Challenge 2015: Stopping the Active Shooter," Proceedings of SPIE, 10184: 101840E1-101840E14 (2017).

* cited by examiner

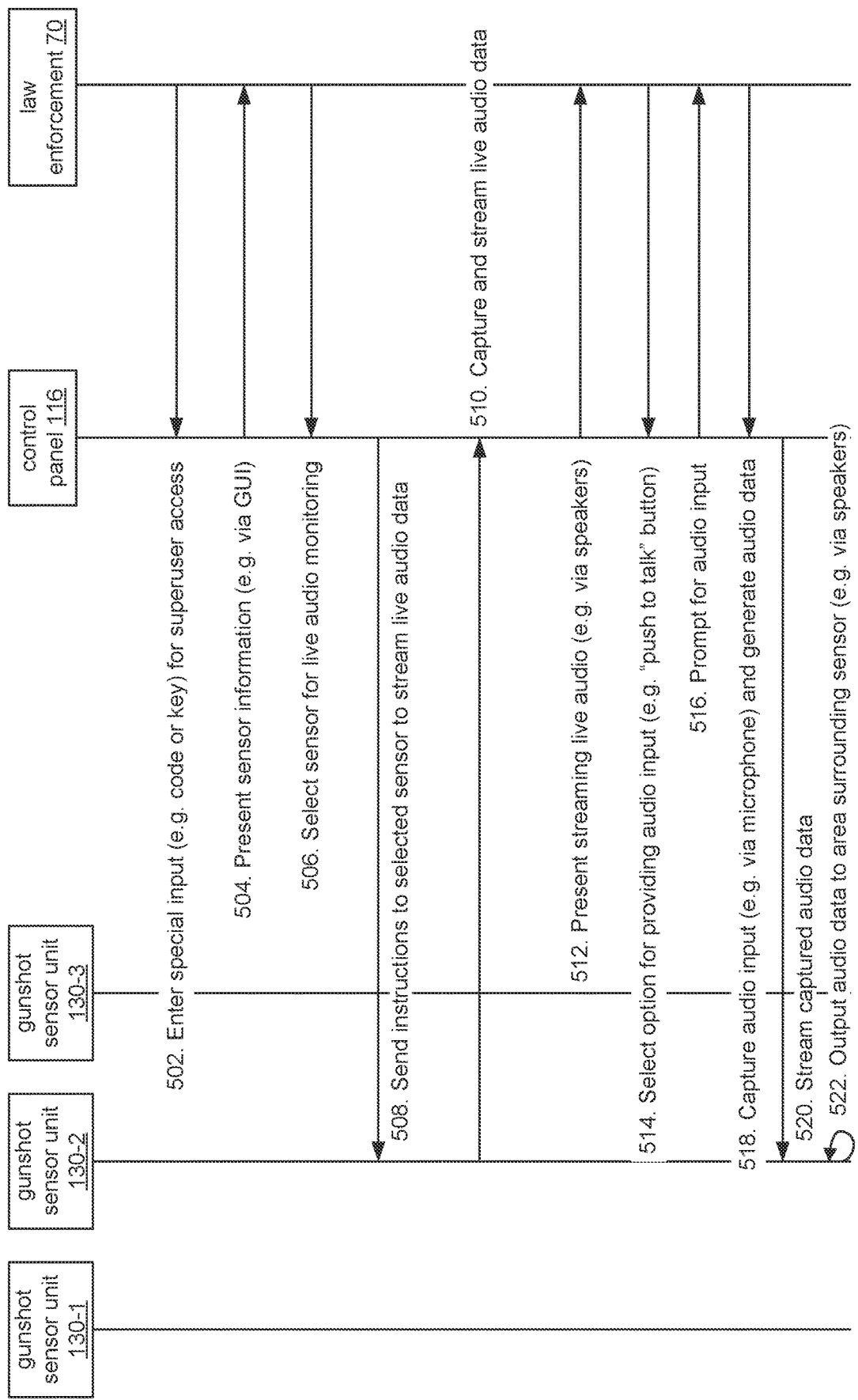

GUNSHOT DETECTION SYSTEM WITH FORENSIC DATA RETENTION, LIVE AUDIO MONITORING, AND TWO-WAY COMMUNICATION

RELATED APPLICATIONS

This application is division of U.S. patent application Ser. No. 16/968,931, filed on Aug. 11, 2020, which is a § 371 National Phase Application of International Application No. PCT/IB2019/051202, filed on Feb. 14, 2019, which claims the benefit under 35 USC 119(e) of U.S. Provisional Application No. 62/631,296, filed on Feb. 15, 2018, and U.S. Provisional Application No. 62/637,161, filed on Mar. 1, 2018, all of which are incorporated herein by reference in their entirety.

This application is related to:

International Application number PCT/IB2019/051203 filed on Feb. 14, 2019, entitled "Gunshot detection system with master slave timing architecture," now International Patent Publication No.: WO 2019/159099;

International Application number PCT/IB2019/051204 filed on Feb. 14, 2019, entitled "Gunshot detection system with encrypted, wireless transmission," now International Patent Publication No.: WO 2019/159100;

International Application number PCT/IB2019/051205 filed on Feb. 14, 2019, entitled "Gunshot detection system with building management system integration," now International Patent Publication No.: WO 2019/159101;

International Application number PCT/IB2019/051206 filed on Feb. 14, 2019, entitled "Gunshot detection system anti-tampering protection," now International Patent Publication No.: WO 2019/159102;

International Application number PCT/IB2019/051207 filed on Feb. 14, 2019, entitled "Gunshot detection system with ambient noise modeling and monitoring," now International Patent Publication No.: WO 2019/159103;

International Application number PCT/IB2019/051208 filed Feb. 14, 2019, entitled "Gunshot detection system with fire alarm system integration," now International Patent Publication No.: WO 2019/159104;

International Application number PCT/IB2019/051209 filed on Feb. 14, 2019, entitled "Gunshot detection sensors incorporated into building management devices," now International Patent Publication No.: WO 2019/159105; and International Application number PCT/I132019/051210 filed on Feb. 14, 2019, entitled "Gunshot detection system with location tracking," now International Patent Publication No. WO 2019/159106.

All of the afore-mentioned applications are incorporated herein by this reference in their entirety.

BACKGROUND OF THE INVENTION

Shooting incidents, involving active shooters shooting victims within buildings such as schools or malls, are increasingly a concern. Identifying and reacting quickly to such incidents can reduce loss of life. For example, first responders need to know if gunshots have actually been fired and the location and number of the fired shots.

In confined areas, such as in a school or a private or public building, detecting and locating the source of gunshots is a complicated problem. A gunshot typically generates several sounds including the gunshot itself, the bullet's bow shockwave, noise from bullet impacts and noise of reflected gunshot sounds. In addition, numerous noises are generated in buildings that may be mistakenly identified as gunshots.

The broad concept of detecting gunshots utilizing acoustics is known. More specifically, it is known to provide a gunshot detection system including an array of acoustic sensors positioned in a pattern which enables signals from the sensors to be employed to not only detect the firing of a gunshot but to also locate the origin of the shot. One main requirement of such a system is the need to accurately distinguish between the sound produced from a gunshot and a host of other ambient sounds. In at least one known arrangement, a microphone is used to detect each sound, which is then amplified, converted to an electrical signal and then the electrical signal is compared with a threshold value above which a gunshot sound is expected to exceed.

Recently, gunshot detection systems with improved accuracy, dependability, and effectiveness have been described. One such system is described in International Publication Number WO 2018/044553, published on Mar. 8, 2018 and entitled "System and Method for Acoustically Identifying Gunshots Fired Indoors." This system provides for low false alarms or false positives and high detection rates by employing two microelectromechanical microphones (MEMs) having different sensitivity levels. Acoustic signals from a first microphone with lower sensitivity (for example, making the anomaly detection microphone essentially deaf to routine sounds) are first analyzed for a peak amplitude level large enough to be a potential gunshot. Then acoustic signals from a second microphone having a higher sensitivity are then analyzed further to confirm that the sound was a gunshot.

Gunshot detection methods have also been proposed that can count the number of gunshots fired, particularly from an automatic or fast acting weapon. One such method is described in International Publication Number WO 2018/044556, published on Mar. 8, 2018 and entitled "Method for Acoustically Counting Gunshots Fired Indoors." In this method, an acoustic signature of captured noise is analyzed to accurately count how many shots are fired. The method can be employed to identify that the gun is an automatic or rapid fire weapon, which information can be provided to emergency personnel.

Additionally, gunshot detection system that can accurately determine where sensed events are located have been proposed. One such system is described in International Publication Number WO 2018/185723, published on Oct. 11, 2018 and entitled "System and Method for Identifying and Locating Sensed Events." Here, a sensor network is employed to detect an event in the form of an audible signal. The event is time stamped and sent to a controller, which evaluates the event as either unique or a multiple detection using the sensor's time of alarm to determine which sensor activated first and to suppress subsequent alarms for the same event. This process is known as de-confliction.

SUMMARY OF THE INVENTION

Features can be added to these gunshot detection systems to make them more useful in a wider range of contexts. For example, audio capture and recording, live monitoring and two-way communication via distributed gunshot sensor units would be useful. Moreover, in many cases it would be beneficial to retain all recorded event data and/or audio data for the data for forensic processing, for example, by law enforcement entities.

Various innovations to gunshot detection systems are proposed. For example, the gunshot detection systems might include gunshot sensor units equipped with anomaly detection microphone for detecting the gunshots and an audio capture microphones for capturing and recording audio data depicting detected gunshots as well as other ambient sounds. Further, gunshot sensor units with environmental boards with various environmental sensors (e.g. accelerometers, temperature sensors, humidity sensors, pressure sensors) could generate environmental data indicating environmental conditions surrounding the gunshot sensor units or the units themselves. In addition, the gunshot sensor units could include RADAR sensors for generating position information indicating positions of bodies with respect to the gunshot sensor units within the area surrounding the gunshot sensor units, including, for example, any active shooter. The audio data, environmental data, and position information might also be stored locally on local nonvolatile storage of the gunshot sensor units for later retrieval by law enforcement entities. Further, the gunshot sensor units could include wired and/or wireless data transfer interfaces for transferring the audio data, environmental data and/or position information to handheld units of law enforcement entities.

The gunshot sensor units might autonomously analyze captured sounds to determine whether to locally store the event data, or they might operate in conjunction with a control panel and/or remote system such as a cloud management system, which is accessible only over public networks. For example, upon de-confliction of received event data indicating potential gunshots, the control panel might instruct the de-conflicted gunshot sensor units, or the gunshot sensor units themselves might decide, to encrypt and/or permanently store the event data in local nonvolatile storage for later retrieval. Further, the control panel could include speakers for providing audio playback of audio data sent from the gunshot sensor units to the control panel, including the locally stored audio data, which can be streamed from the gunshot sensor units to the control panel. The control panel can also instruct the gunshot sensor units to capture and stream live audio data for audio playback via the speakers at the control panel.

Because of the sensitive nature of audio capture and recording, the gunshot detection system should also include features for preventing the gunshot sensor units from indiscriminately capturing audio data and for restricting access to the audio data to proper authorities. The gunshot sensor units might thus include functionality for detecting speech sounds and automatically deleting any audio data depicting the speech sounds. Additionally, special inputs (e.g. keys, codes, decryption keys for encrypted audio data, multi-factor authentication queries, physical tokens, biometric information generated by biometric sensors) could be required for super-user access to stored audio data and/or live monitoring. Thus in one example, the control panel could also include a microphone, allowing two-way communication between the control panel and gunshot sensor units equipped with speakers. In addition, the control panel could include a display on which a graphical user interface (GUI) is presented. The GUI presents sensor information for the gunshot sensor units and receives input indicating selections of different options for each unit. These options might include local event data retrieval, live monitoring and/or two-way communication, among other examples.

In general, according to one aspect, the invention features a system for detecting gunshots within a premises. The system includes gunshot sensor units for detecting the gunshots. These units comprise one or more microphones that detect acoustic anomalies indicating potential gunshots and generate audio data depicting the acoustic anomalies. The gunshot sensor units include controllers, which generate event data based on the detected acoustic anomalies. The audio data and event data are locally stored by the gunshot sensor units in the gunshot sensor units' nonvolatile storage.

In embodiments, the system might further comprise a control panel, which receives the event data and the audio data from the gunshot sensor units. The control panel could instruct the gunshot sensor units to send the audio data to the control panel and/or to locally store the audio data and the event data based on the received event data. Alternatively, the control panel might receive truncated audio data depicting only the acoustic anomalies (e.g. gunshots) and instruct the gunshot sensor units to send the full audio data to the control panel or otherwise to encrypt and/or locally store the full audio data and all of the event data based on the received truncated audio data. Typically, the control panel might determine which one of the gunshot sensor units is closest to the source of the acoustic anomaly based on the received event data and instruct the de-conflicted gunshot sensor units that are not closest to the source to locally store the audio data. During this process, the control panel would also generate and store order information indicating an order in which the gunshot sensor units detected the acoustic anomalies based on the received event data.

In addition, the control panel might generate and display a graphical user interface, on a touch-screen display panel, for example, for providing sensor information to an operator and for receiving input from the operator indicating selections of different gunshot sensor units for retrieval of the locally stored audio data and/or event data.

The gunshot sensor units can send the locally stored audio data and/or event data to computing devices of law enforcement entities and/or to a cloud gunshot detection management system. Such a cloud gunshot detection management system would generally be characterized as a system of application servers and databases that are only accessible over data connections that include public networks among other networks.

In addition to the audio data, the gunshot sensor units can also generate environmental data indicating environmental conditions in an area surrounding the gunshot sensor unit or the unit itself. This environmental data is generated via environmental sensors of the gunshot sensor units, including accelerometers, temperature sensors, humidity sensors, pressure sensors, e.g., barometric pressure sensors, and/or low frequency radar sensors.

In general, according to another aspect, the invention features a method for detecting gunshots within a premises. Acoustic anomalies indicating potential gunshots are detected via one or more microphones of gunshot sensor units. Audio data is generated depicting the acoustic anomalies, and event data is generated based on the detected acoustic anomalies. The audio data and event data are stored in nonvolatile storage of the gunshot sensor units.

In general, according to another aspect, the invention features a system for detecting gunshots within a premises. The system comprises gunshot sensor units and a control panel. The gunshot sensor units, which detect the gunshots, comprise one or more microphones for detecting acoustic anomalies indicating potential gunshots and for generating audio data depicting the acoustic anomalies and controllers for generating event data based on the detected acoustic anomalies. The control panel receives the event data and the audio data from the gunshot sensor units and provides audio playback of the audio data received from the gunshot sensor units via speakers of the control panel.

In general, according to another aspect, the invention features a method for detecting gunshots within a premises. Acoustic anomalies indicating potential gunshots are detected, and audio data depicting the acoustic anomalies are generated via one or more microphones of gunshot sensor units. Event data is generated based on the detected acoustic anomalies. Audio playback of the audio data is provided via speakers of a control panel, wherein the control panel receives the event data and the audio data from the gunshot sensor units.

In general, according to another aspect, the invention features a system for detecting gunshots within a premises. Gunshot sensor units, which detect the gunshots, comprise one or more microphones for detecting acoustic anomalies indicating potential gunshots and for generating audio data depicting the acoustic anomalies, nonvolatile storage for locally storing the audio data, and controllers for filtering speech sounds from the audio data.

In general, according to another aspect, the invention features a method for detecting gunshots within a premises. Acoustic anomalies indicating potential gunshots are detected and audio data depicting the acoustic anomalies are via one or more microphones of gunshot sensor units. The audio data is locally stored in nonvolatile storage of the gunshot sensor units, and speech sounds are filtered from the audio data.

In general, according to another aspect, the invention features a system for detecting gunshots within a premises. The system comprises gunshot sensor units for detecting the gunshots and a control panel. The gunshot sensor units comprise one or more microphones for detecting acoustic anomalies indicating potential gunshots and for generating audio data depicting the acoustic anomalies. The control panel comprises an audio buffer for storing streaming audio data received from the gunshot sensor units. The gunshot sensor units stream the audio data to the control panel for a higher level analysis in response to determining that a level of certainty of the audio data depicting gunshots is below a predetermined threshold. The control panel instructs the gunshot sensor units to locally store or delete the audio data based on whether the higher level analysis indicates that the streamed audio data depicts gunshots.

In general, according to another aspect, the invention features a method for detecting gunshots within a premises. Acoustic anomalies indicating potential gunshots are detected and audio data depicting the acoustic anomalies are via one or more microphones of gunshot sensor units. Streaming audio data from the gunshot sensor units is stored in an audio buffer of a control panel. The gunshot sensor units stream the audio data to the control panel for a higher level analysis in response to determining that a level of certainty of the audio data depicting gunshots is below a predetermined threshold. The control panel instructs the gunshot sensor units to locally store or delete the audio data based on whether the higher level analysis indicates that the streamed audio data depicts gunshots.

In general, according to another aspect, the invention features a system for detecting gunshots within a premises. The system comprises gunshot sensor units for detecting the gunshots. The gunshot sensor units comprise one or more microphones for detecting acoustic anomalies indicating potential gunshots and for generating audio data depicting the acoustic anomalies, controllers for generating event data based on the detected acoustic anomalies, and nonvolatile storage for locally storing the audio data and the event data. The gunshot sensor units also comprise wired and/or wireless interfaces for sending the locally stored audio data and event data to computing devices of law enforcement entities.

In general, according to another aspect, the invention features a method for detecting gunshots within a premises. Acoustic anomalies indicating potential gunshots are detected and audio data depicting the acoustic anomalies are via one or more microphones of gunshot sensor units. Event data is generated based on the detected acoustic anomalies. The audio data and event data are locally stored in nonvolatile storage of the gunshot sensor units. The locally stored audio data and event data are sent to computing devices of law enforcement entities via wired and/or wireless interfaces of the gunshot sensor units.

In general, according to another aspect, the invention features a system for detecting gunshots within a premises. The system comprises gunshot sensor units for detecting the gunshots and a control panel. The gunshot sensor units comprise one or more microphones for detecting acoustic anomalies indicating potential gunshots and for generating audio data depicting the acoustic anomalies and controllers for generating event data based on the detected acoustic anomalies. The control panel receives the audio data and/or the event data from the gunshot sensor units and generates and sends live monitoring instructions to the gunshot sensor units. In response to receiving the live monitoring instructions, the gunshot sensor units generate and stream live audio data depicting ambient sound to the control panel.

In embodiments, the control panel might further include a user interface for receiving a special authorization input for super-user access from an operator of the control panel, and the control panel generates and sends the live monitoring instructions only in response to receiving the special authorization input. The control panel might also comprise a microphone for generating audio data that is live streamed to the gunshot sensor units, in which case the gunshot sensor units further comprise speakers for providing audio playback of the live audio data streamed from the control panel.

In general, according to another aspect, the invention features a method for detecting gunshots within a premises. Acoustic anomalies indicating potential gunshots are detected and audio data depicting the acoustic anomalies are via one or more microphones of gunshot sensor units. Event data is generated based on the detected acoustic anomalies. Live monitoring instructions are generated and sent to the gunshot sensor units. The gunshot sensor units generate and stream live audio data depicting ambient sound to a control panel in response to the live monitoring instructions.

In general, according to another aspect, the invention features a system for detecting gunshots within a premises. The system comprises gunshot sensor units for detecting the gunshots and a control panel. The gunshot sensor units comprise one or more microphones for detecting acoustic anomalies indicating potential gunshots and for generating audio data depicting the acoustic anomalies, controllers for generating event data based on the detected acoustic anomalies, and nonvolatile storage for locally storing the audio data and event and other meta data. The control panel, which receives the audio data and/or the event data from the gunshot sensor units, comprises a microphone for generating audio data of a panel operator's speech, speakers for providing audio playback of audio data for the operator, and a graphical user interface. The graphical user interface, rendered on a touch-screen display panel, for example, provides sensor information to the operator of the control panel and receives input from the operator indicating selections of different gunshot sensor units for retrieval of locally stored audio data and event data, live audio data streaming from the gunshot sensor units, and/or two-way communication between the control panel and the gunshot sensor units.

In general, according to another aspect, the invention features a method for detecting gunshots within a premises.

Acoustic anomalies indicating potential gunshots are detected and audio data depicting the acoustic anomalies are via one or more microphones of gunshot sensor units. Event data is generated based on the detected acoustic anomalies. The audio data and event data are locally stored in nonvolatile storage of the gunshot sensor units. Via a graphical user interface, sensor information is provided to an operator of a control panel, and input is received from the operator, the input indicating selections of different gunshot sensor units for retrieval of the locally stored audio data and event data, live audio data streaming from the gunshot sensor units, and/or two-way communication between a control panel and the gunshot sensor units via a microphone for generating audio data and speakers for providing audio playback of audio data of the control panel.

In general, according to another aspect, the invention features a system for detecting gunshots within a premises. The system comprises gunshot sensor units for detecting the gunshots. The gunshot sensor units comprise one or more microphones for detecting acoustic anomalies indicating potential gunshots and for generating audio data depicting the acoustic anomalies. Controllers of the gunshot sensor units generate event data based on the detected acoustic anomalies, and the gunshot sensor units send the event data and audio data to a cloud gunshot detection management system via wired and/or wireless interfaces of the gunshots sensor units and a public network.

In general, according to another aspect, the invention features a method for detecting gunshots within a premises. Acoustic anomalies indicating potential gunshots are detected, and audio data depicting the acoustic anomalies is generated via one or more microphones of gunshot sensor units. Event data is generated based on the detected acoustic anomalies. The audio data and event data are sent to a cloud gunshot detection management system via wired and/or wireless interfaces of the gunshot sensor units and a public network.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 5 is a sequence diagram illustrating an exemplary process by which the gunshot detection system provides live audio monitoring and two-way communication;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
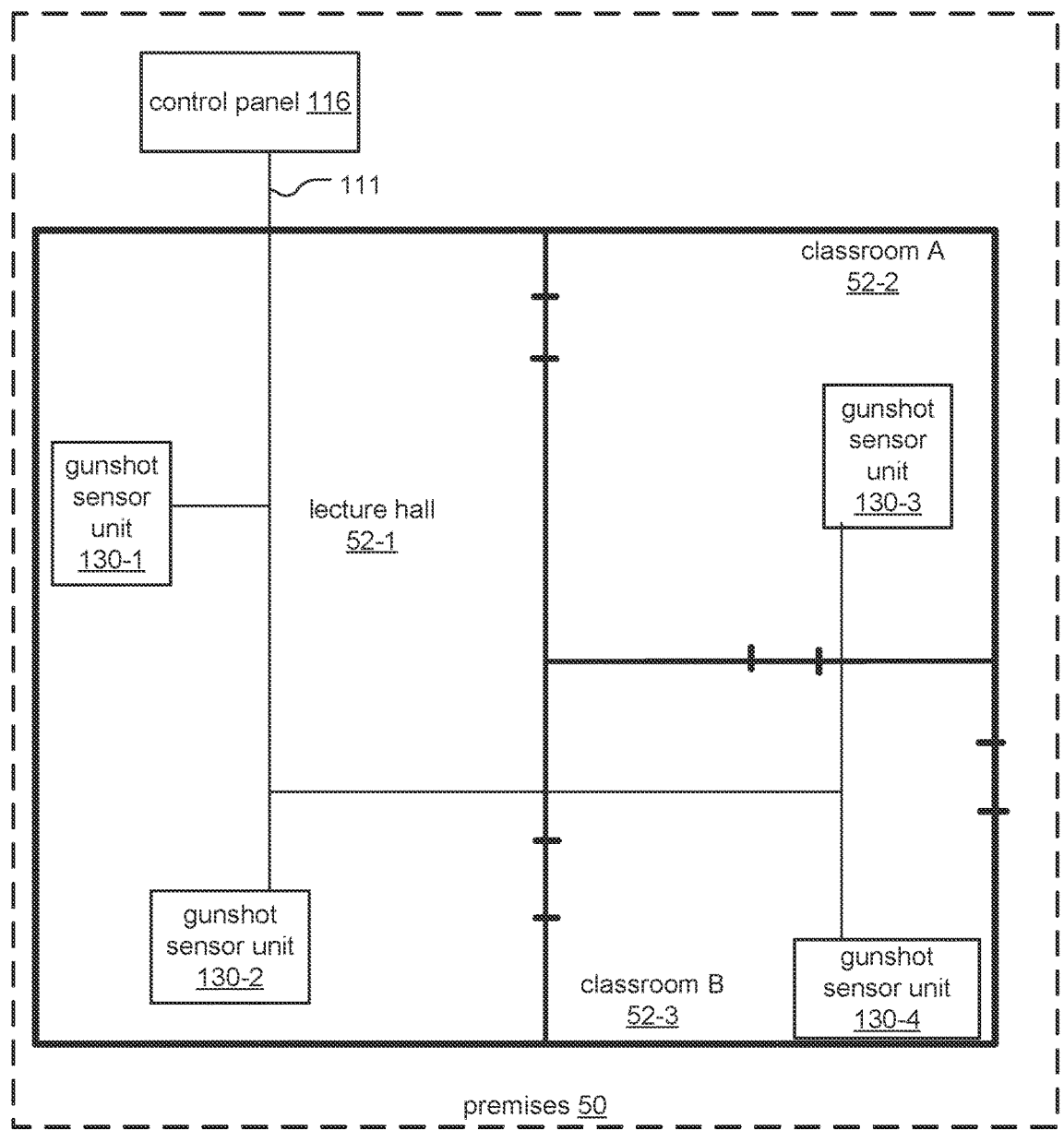
FIG. 1 is a schematic diagram of an exemplary gunshot detection system showing a common context for embodiments of the present invention.

FIG. 1 is a schematic diagram of an exemplary gunshot detection system 100.

In general, the gunshot detection system 100 monitors, detects and reports the occurrence of gunshots or other emergencies within a premises 50 such as a building (e.g. office, hospital, warehouse, retail establishment, shopping mall, school, multi-unit dwelling, government building).

In the illustrated example, the premises 50 is a simplified floor example of a building with three areas 52, a lecture hall 52-1, classroom A 52-2, and classroom B 52-3. Two gunshot sensor units 130-1, 130-3 are located in the lecture hall 52-1, while one gunshot sensor unit 130-2 is located in classroom A 52-2, and one gunshot sensor unit 130-4 is located in classroom B 52-3.

In the illustrated embodiment, the gunshot detection system 100 includes gunshot sensor units 130, a control panel 116, and a communication network 111. In general, and in one configuration, the gunshot sensor units 130 detect conditions indicative of the gunshots or other emergencies and alert the control panel 116, which takes one or more responsive actions such as alerting building personnel, law enforcement, and/or a monitoring center, or collecting and presenting data pertaining to the detected gunshots to an operator of the control panel 116. The gunshot sensor units 130 and the control panel 116 communicate over the communication network 111.

More specifically, the gunshot sensor units 130 are distributed throughout the premises 50, for example, in areas 52 of the premises such as rooms, hallways, lobbies or stairways, to name a few examples. The gunshot sensor units 130 detect acoustic anomalies indicating potential gunshots and generate audio data depicting the acoustic anomalies. The gunshot sensor units 130 also generate event data based on and descriptive of the acoustic anomalies and locally store and/or send the event data to the control panel 116.

The event data often includes: audio data (e.g. digitized audio clips) depicting the acoustic anomalies; metadata including, for example, time information indicating when the acoustic anomalies started and/or stopped, duration information for the acoustic anomalies and/or the audio data depicting the acoustic anomalies, file information, and identification information for the gunshot sensor unit 130; environmental data indicating environmental conditions in the areas 52 where the gunshot sensor units 130 are located; position information indicating positions of detected bodies (e.g. an active shooter, occupants of the premises 50) with respect to the gunshot sensor unit 130; and other sensor data generated by the gunshot sensor unit 130. The event data can be locally stored, collected by the control panel 116, transferred to remote servers, and/or transferred to devices of law enforcement entities for forensic analysis, for example. Additionally, some event data might be generated by other devices such as distributed devices of building management systems via environmental sensors of the distributed devices, for example.

On the other hand, the control panel 116 directs the overall functionality of the gunshot detection system 100 by sending instructions (e.g. control messages) to be executed by the gunshot sensor units 130, receiving the event data from the gunshot sensor units 130 and taking the responsive actions based on the event data. The control panel 116 might receive preliminary event data (e.g. metadata indicating time information, or truncated audio data) from multiple gunshot sensor units 130 and perform a de-confliction process in order to determine which event data from the different sensor units 130 pertains to the same detected acoustic anomaly and which of the gunshot sensor units 130 is closest to the source of the acoustic anomaly based on, for example, which of the units first detected the acoustic anomaly. The control panel 116 might then send instructions to the gunshot sensor unit 130 closest to the source to send full event data (e.g. including a full audio data sample, environmental data, and other sensor data) to the control panel 116 for further processing and/or to be presented to the operator. At the same time, the control panel 116 instructs de-conflicted gunshot sensor units 130 that were not closest to the source to locally store the full event data for future retrieval.

It should be noted that the analytical processes performed by the control panel 116 and/or the gunshot sensor units 130 to be described might be performed in any combination of steps, using any combination of the described features of each of the devices, including omitting steps and/or features.

Figure 2A:
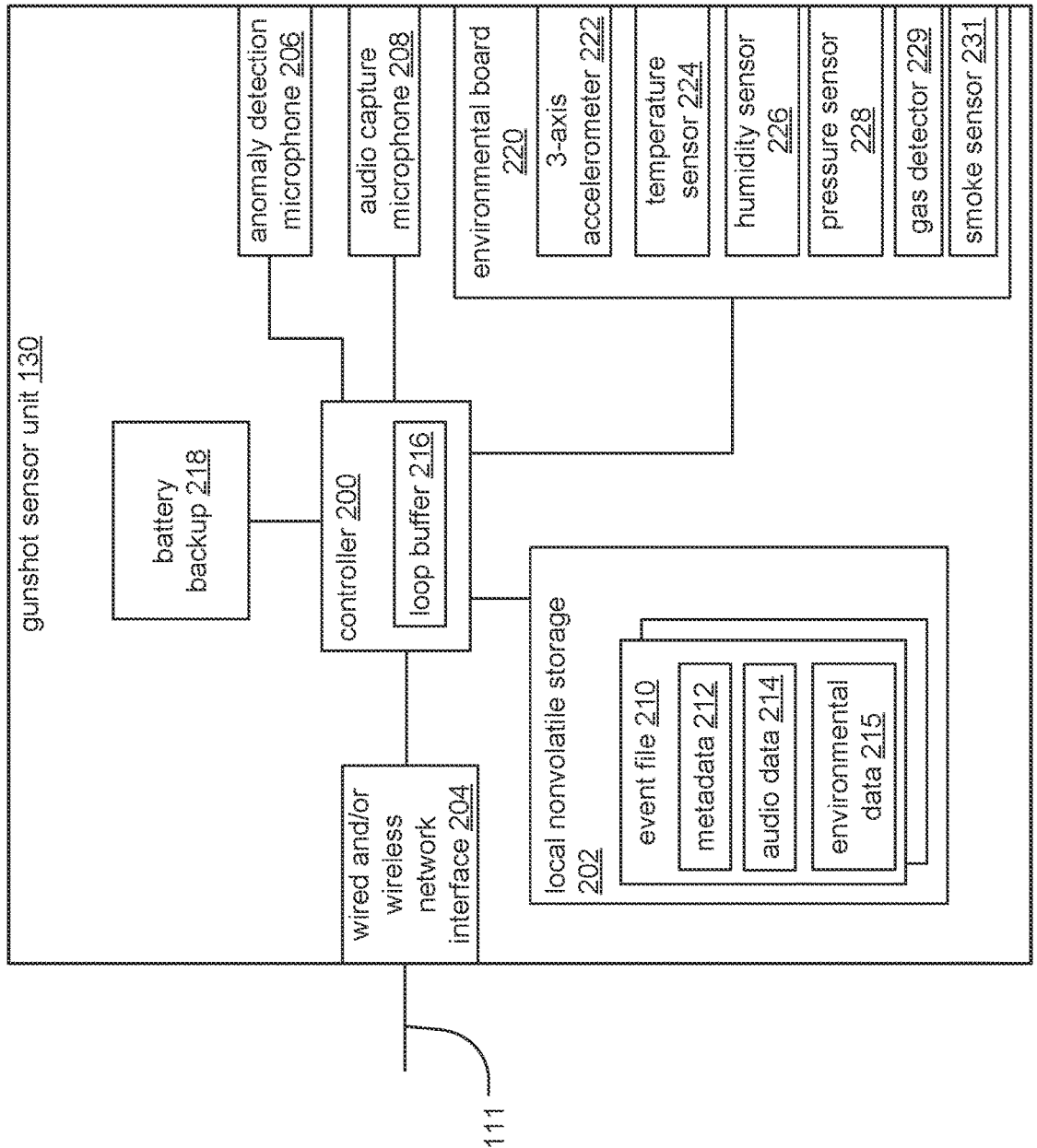
FIG. 2A is a block diagram showing an exemplary gunshot sensor unit of the gunshot detection system according to the present invention.

FIG. 2A is a block diagram showing an exemplary gunshot sensor unit 130.

The gunshot sensor unit 130 includes a controller 200, local nonvolatile storage 202, a wired and/or wireless network interface 204, a battery backup 218, an anomaly detection microphone 206, an audio capture microphone 208, and an environmental board 220.

The controller 200 executes firmware/operating system instructions and generally directs the functionality of the gunshot sensor unit 130. In one example, the controller 200 is small single-board computer. In other examples, the controller is a microcontroller unit or a system on a chip (SoC), including one or more processor cores along with memory and programmable input/output peripherals such as analog to digital converts and digital to analog converters.

The wired and/or wireless network interface 204 provides connectivity with the control panel 116 and possibly other devices via the communication network 111. In addition, the network might also provide power to the device, in many examples. Direct current (DC) might be superimposed upon the data that is transmitted between the devices and other nodes on the network such as in Power over Ethernet (PoE) systems. In other examples, the gunshot sensor units 130 might receive power from alternative power supplies such as a supervised power circuit, ambient solar power, or motion harvesting power generation.

The battery backup 218 provides backup power to the gunshot sensor unit 130, which might normally receive power from a primary power source such as over the networks or such as a mains power line (not pictured) supplying alternating current electric power to the gunshot sensor unit 130, typically at voltages ranging from 110 to 240 Volts. In one embodiment, the mains power line or house power provides power at 120 or 240 Volts (V) to the control panel 116, which then feeds the power to the gunshot sensor units 130 through a supervised power circuit at 24 V. In the event that the primary power source could not provide power (e.g. due to being damaged in a shooting incident), the battery backup 218 would continue to power the gunshot sensor unit 130 typically at 24 V.

The anomaly detection microphone 206 detects the acoustic anomalies, while the audio capture microphone 208 captures ambient sound and generates the audio data. In one embodiment, both microphones 206, 208 are micro electromechanical system (MEMS) microphones having different sensitivity levels, and the controller 200 is configured to sample the microphones 206, 208 such that outputs from the microphones can be continuously analyzed in near real time for an acoustic signature. The anomaly detection microphone 206 has the lower sensitivity level and a high clipping level, while the audio capture microphone 208 has the higher sensitivity level. The audio capture microphone 208 continuously captures ambient sound, which is stored in a loop of a preconfigured buffer duration (e.g. 9.9 seconds) in a ring buffer 216 of the controller 200. At the same time, incoming acoustic signals from the anomaly detection microphone 206 are continuously analyzed to detect acoustic anomalies, particularly by searching the incoming acoustic signal for a peak amplitude level large enough to be at least preliminarily identified as a gunshot.

Once an indication of a possible gunshot has been triggered utilizing the anomaly detection microphone 208, further processing may be performed by the controller 200. The controller 200 analyzes the sound stored in the loop to confirm that the acoustic anomaly is a gunshot. If confirmed as a gunshot, the controller 200 stores the captured sound in the loop buffer 216, which would include the acoustic anomaly and the previously captured sound (up to the entirety of the preconfigured buffer duration, which is 9.9 seconds in this example) as audio data 214 in the local nonvolatile storage 202 associated with different event files 210 or instances of event data for different gunshot detection events, along with the metadata 212 and the environmental data 215 for the events. In embodiments, the local nonvolatile storage 202 could be fixed storage such as flash memory, or removable storage such as an SD card, among other examples.

In another example, the gunshot sensor unit 130 includes one or more additional microphones for generating audio data to be live-streamed to the control panel 116 for the purposes of live-monitoring and/or two-way communication. This configuration allows the anomaly detection microphone 206 and the audio capture microphone 208 to be used exclusively for the primary purpose of the units, namely, detecting gunshots.

The environmental board 220 includes a series of environmental sensors for generating the environmental data. In the illustrated example, the environmental board 220 includes a 3-axis accelerometer 222, which detects the orientation of the gunshot sensor unit in the earth's gravitational field and movements of the unit, a temperature sensor 224, which detects ambient air temperature, a humidity sensor 226, which detects the humidity of the ambient air, a pressure sensor 228, which detects the atmospheric pressure of the ambient air, a gas detector 229 which detects the presence of gases such as carbon monoxide (CO) and ammonia ($NH_3$), which are typical components of fumes from firing weapons, and a smoke sensor 231 for detecting smoke and/or other airborne particles emitted from firing a weapon.

Figure 2B:
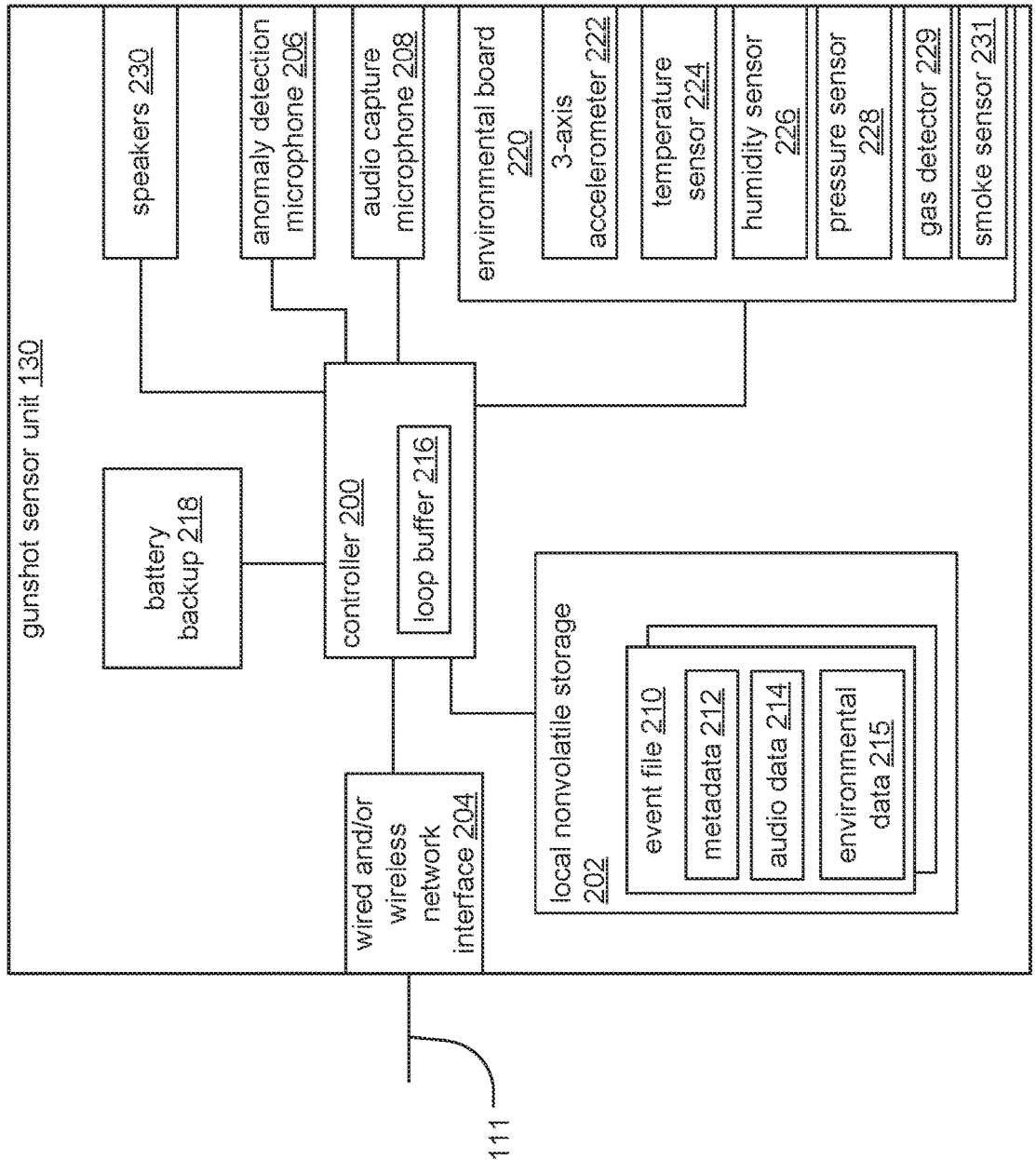
FIG. 2B is a block diagram showing an exemplary gunshot sensor unit according to another embodiment of the present invention in which the gunshot sensor unit includes speakers according to the present invention.

FIG. 2B is a block diagram showing an exemplary gunshot sensor unit 130 according to another embodiment of the present invention. Here, the gunshot sensor unit includes speakers 230 for providing audio playback of audio data streamed from the control panel 116 or another source. The speakers 230, in combination with the unit's microphone(s) enable two-way communication between, for example, an operator of the control panel 116 and individuals the area 52 where the gunshot sensor unit 130 is located, such as an active shooter or occupants of the premises 50.

Figure 2C:
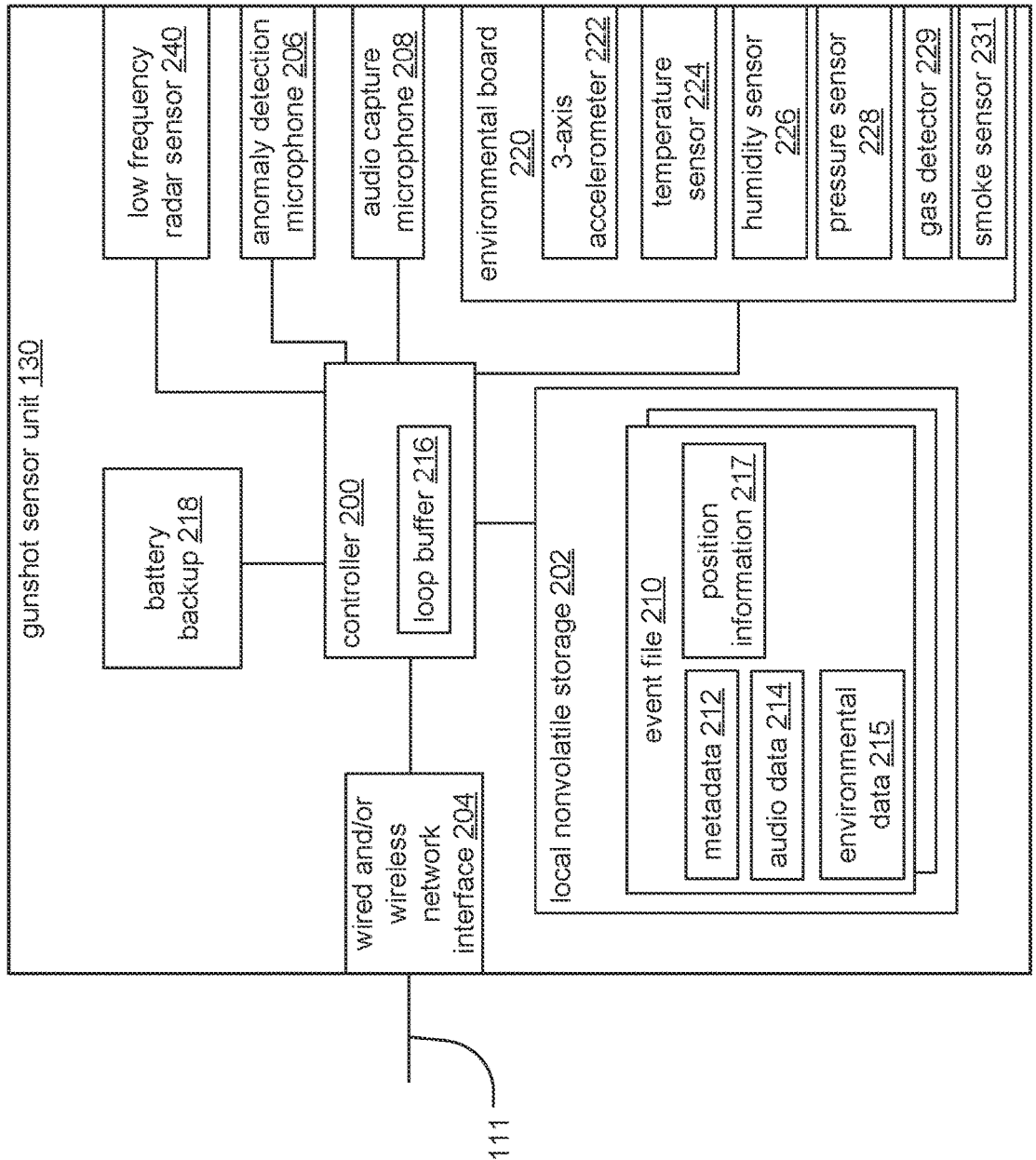
FIG. 2C is a block diagram showing an exemplary gunshot sensor unit according to another embodiment of the present invention in which the gunshot sensor unit includes a low frequency radar sensor according to the present invention.

FIG. 2C is a block diagram showing an exemplary gunshot sensor unit 130 according to another embodiment of the present invention. Here, the gunshot sensor unit includes a low frequency RADAR sensor 240 (operating in a 3-80 GHz range, for example), which is used to generate position information 217 indicating positions with respect to the gunshot sensor unit 130 of bodies in the area 52 where the gunshot sensor unit 130 is located, such as those of an active shooter or occupants of the premises 50. The position information preferably further includes information indicating relative spatial position as well as body position (e.g. upright, prone), along with physiological indicators. The position information 217 is generated and stored with the event data in the local nonvolatile storage 202, sent to the control panel 116, and/or provided to law enforcement.

In one embodiment, the low frequency RADAR sensor 240 could operate in conjunction with a wireless receiver and/or antenna (e.g. of the wired and/or wireless network interface 204) for receiving radiofrequency signals according to IEEE 802.15 standards such as Bluetooth or Bluetooth Low Energy, among other examples. Individuals such as occupants, armed personnel including law enforcement officers or security personnel and/or first responders are then equipped with passive or active tags which broadcast wireless signals including, for example, identification information for the tags and/or the individuals. Each gunshot sensor unit 130 receives the broadcast identification information via the wireless receiver and sends the information to the control panel 116, which resolves the identity and location of the individual based on the identification information and the location of the gunshot sensor unit 130. The control panel 116 also determines whether there were individuals detected via the low frequency RADAR sensor 240 that were not detected via the wireless receiver and infer that the unidentified individual (e.g. without an actively transmitting tag) is the active shooter and/or a victim/civilian.

Figure 3:
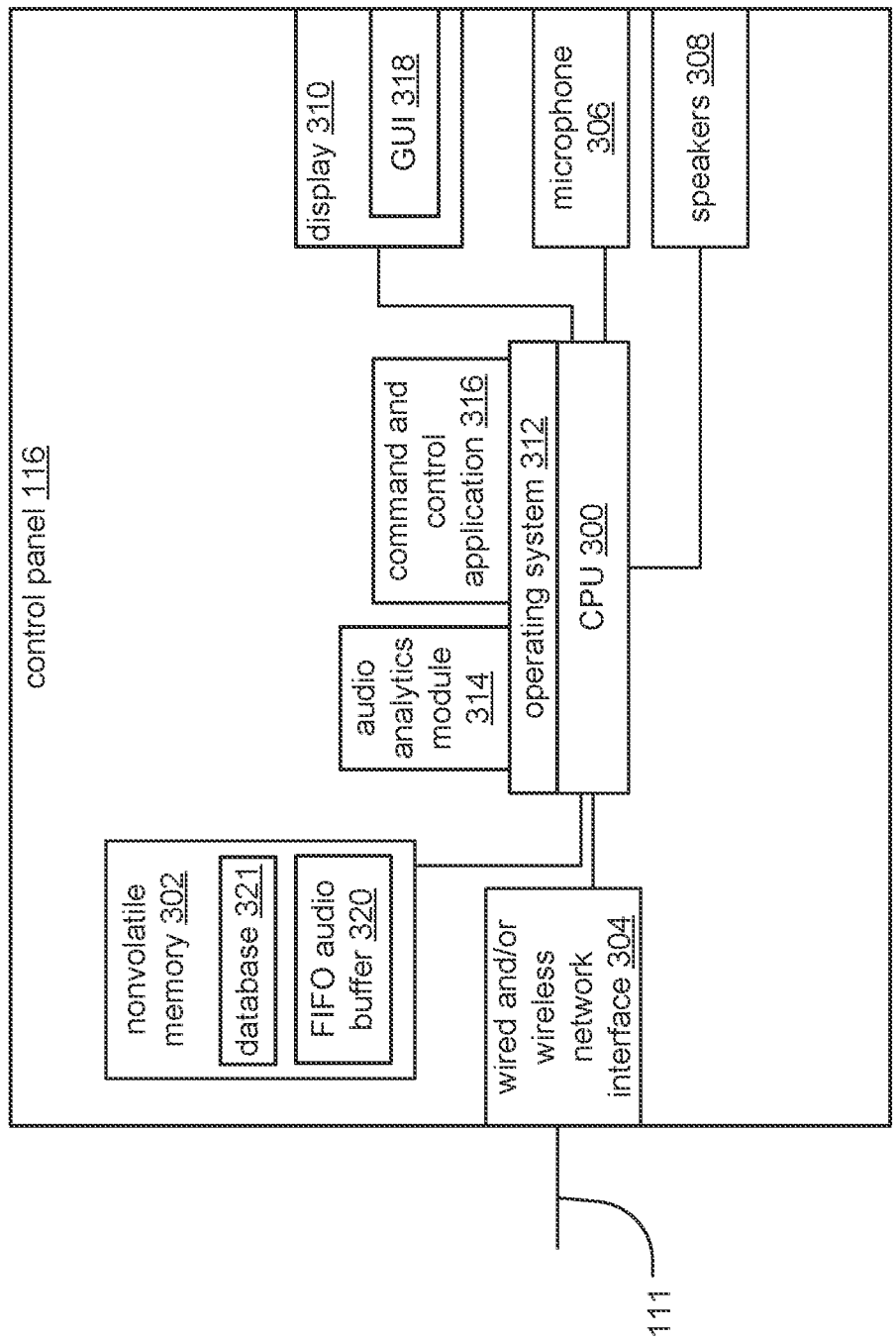
FIG. 3 is a block diagram showing an exemplary control panel of the gunshot detection system according to the present invention.

FIG. 3 is a block diagram showing an exemplary control panel 116.

The control panel 116 includes a central processing unit (CPU) 300, nonvolatile memory 302, a wired and/or wireless network interface 304, a display 310, a microphone 306, and speakers 308.

Similar to analogous components on the gunshot sensor units 130, the wired and/or wireless network interface 304 provides connectivity with the gunshot sensor units 130 and possibly other devices via the communication network 111. In some examples, the control panel may also supply power to the units.

The speakers 308 provide audio playback of streamed audio data from the gunshot sensor units 130. The audio data can be the locally stored audio data 214 depicting the acoustic anomalies or can be captured and streamed live for live monitoring of the ambient sound in the area 52 where the gunshot sensor unit 130 is located.

The microphone 306 is used to capture speech sound from the operator of the control panel 116 for generating audio data to be streamed back to the gunshot sensor units 130 during two-way communication between the control panel 116 and the gunshot sensor units 130.

The CPU 300 executes firmware instructions and an operating system (OS) 312 and generally directs the functionality of the control panel 116. The OS 312 interfaces with the hardware components of the control panel 116 for access by an audio analytics module 314 and a command and control application 316, which are software processes executing on top of the OS 312.

The audio analytics module 314 performs a higher-level analysis of audio data received from the gunshot sensor units 130, for example, in order to confirm that the audio data depicts gunshots when a first analysis by the controller 200 of the gunshot sensor unit 130 is unable to confirm the gunshots with a certainty above a predetermined threshold. The audio analytics module 314 performs the analysis by retrieving audio data files from a first-in-first-out (FIFO) audio buffer 320 in the nonvolatile memory 302, determining whether the ambient sound and/or acoustic anomalies depicted in the audio data files include gunshots and instructing the gunshot sensor unit 130 to either delete or permanently store the audio data and/or event data in local nonvolatile storage 202. The higher-level analysis might also include analyzing the sensor data generated by the sensors of the environmental board 220 of the gunshot sensor units 130 for contextual information that might confirm that an acoustic anomaly was a gunshot. In one example, the audio analytics module 314 could isolate a loud acoustic signature in the audio data that could be a gunshot and determine whether the sensor data indicates that the presence of gases such as carbon monoxide (CO) and ammonia ($NH_3$) and/or smoke and other airborne particles were detected by the gas detector 229 and the smoke sensor 231 shortly after the occurrence of the acoustic anomaly.

The command and control application 316, in general, generates a graphical user interface (GUI) 318 that is rendered on the display 310 (e.g. touchscreen display) of the control panel 116. The GUI 318 presents gunshot sensor unit information to the operator and receives input indicating selections of various options for controlling the gunshot sensor units 130 such as retrieving locally stored event data and/or audio data, initiating live monitoring, and/or initiating two-way communication between the control panel 116 and the gunshot sensor units 130. Based on the received input, the command and control application 316 generates instructions (e.g. control messages) to be executed by the gunshot sensor units 130, for example.

The gunshot detection system 100 also includes a gunshot event database 321 for storing event data, audio data, environmental data, position information, and any generated audio, event and/or environmental data analytics information, such as forensic data generated as a result of processing the data received from the gunshot sensor units 130, or order information indicating the order in which the gunshot sensor units 130 detected the gunshots. In the illustrated example, the gunshot event database 321 is stored in the nonvolatile memory 302 of the control panel 116. However, in other examples, the gunshot event database 321 might be part of a cloud management system and/or connected services system, which is accessible only over public networks, or even on the local nonvolatile storage 202 of the gunshot sensor units 102 themselves.

Figure 4A:
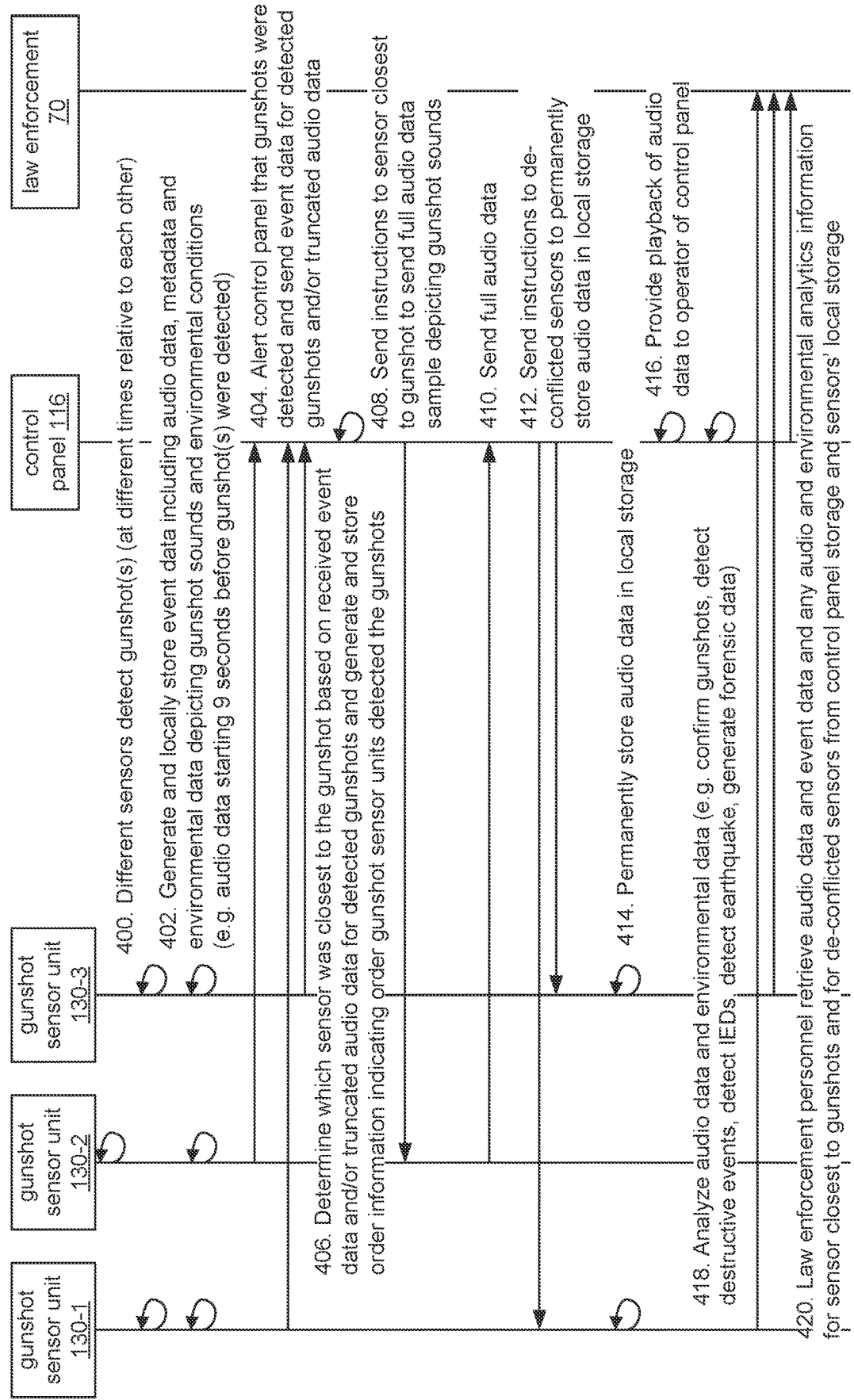
FIG. 4A is a sequence diagram illustrating an exemplary process by which the gunshot detection system detects gunshots, locally stores event data, analyzes the event data and provides the event data to a law enforcement entity.

FIG. 4A is a sequence diagram illustrating an exemplary process by which the gunshot detection system 100 detects gunshots, locally stores event data and/or audio data, analyzes the event data and/or audio data and provides the event data and/or audio data to a law enforcement entity 70.

First, in step 400, three different gunshot sensor units 130-1, 130-2, 130-3 detect gunshots at different times relative to each other. This is a common scenario since the sound of the same gunshot will have different propagation delays to different sensors at different distances from the gunshot. The gunshot sensor units 130 detect acoustic anomalies indicative of the gunshot via the anomaly detection microphones 206, for example, by searching the incoming acoustic signal from the anomaly detection microphone 206 for a peak amplitude level large enough to be identified as a gunshot. The timing of when the gunshot sensor units 130 detect the same gunshots relative to each other is significant, because the first gunshot sensor unit 130 to detect an acoustic anomaly can be inferred to be closest to the source of the acoustic anomaly and thus closest to an active shooter. In the illustrated example, the gunshot sensor unit 130-2 detects the gunshots first, followed by the gunshot sensor units 130-1, 130-2.

In step 402, each of the three gunshot sensor units 130-1, 130-2, 130-3, having detected the gunshots, generate and locally store event data based on the acoustic anomaly including metadata indicating the timing of the gunshots, audio data depicting the gunshots and any other ambient sound captured by the audio capture microphone 208 (e.g. audio data starting at a preconfigured buffer duration such as 9 seconds before the gunshots were detected and proceeding through the gunshot sounds and after), environmental data generated by the sensors of the environmental board 220, and/or position information generated by the low frequency radar sensor 240.

In step 404, the three gunshot sensor units 130-1, 130-2, 130-3 alert the control panel 116 that gunshots were detected and send at least some of the event data to the control panel 116. In one example, the gunshot sensor units 130 might send only a preliminary portion of the event data to the control panel 116, such as the metadata indicating the timing information for the gunshots. In another example, the gunshot sensor units 130 might send truncated audio data, i.e., audio data representing less than 1 second of sound, depicting only the acoustic anomalies (e.g. with ambient sound before and after the acoustic anomalies removed). In another example, the gunshot sensor units 130 might stream the captured audio data to the control panel 116 for higher level analysis and include audio data representing more than 1 second of sound, such as the entire preconfigured buffer duration (e.g. all 9 seconds) of buffered audio data. In yet another example, the gunshot sensor units 130 might send all of the recorded event data to the control panel 116.

In step 406, the control panel 116 performs a de-confliction process and determines which gunshot sensor unit 130 was closest to the source of the acoustic anomaly based on the received event data and/or truncated audio data. As previously described, this process involves determining which event data received from the gunshot sensor units 130 pertain to the same acoustic anomalies and then determining which of the gunshot sensor units 130 detected each of the acoustic anomalies first (e.g. based on the metadata indicating the timing information for the gunshots). The control panel 116 generates and stores, for example, in the gunshot event database 321 of the gunshot detection system 100, order information indicating an order in which the gunshot sensor units 130 detected each of the gunshots.

In step 408, the control panel 116 sends instructions to the gunshot sensor unit 130-2 that was determined to be closest to the gunshots to send its full event data, including a full captured audio data sample depicting the gunshots and any ambient sound before and/or after the gunshots. In response, the gunshot sensor unit 130-2 sends the full event data including the full audio data sample to the control panel 116 in step 410. In one example, the full event includes the 9 seconds of buffered audio data and possibly more than 1 minute of stored audio data from after the gunshot. In addition, full event data also includes, in some examples, acceleration information from the 3-axis accelerometer 222, detected temperature from the temperature sensor 224, detected humidity from the humidity sensor 226, detected pressure from the pressure sensor 228 along with position information from the RADAR sensor 240, detected gases from the gas detector 229, and detected smoke and/or particles from the smoke sensor 231.

In step 412, the control panel 116 sends instructions to the de-conflicted gunshot sensor units 130 that were not closest to the source of the gunshots to encrypt and/or permanently store the event data and/or audio data in the local nonvolatile storage 202. In response, the de-conflicted gunshot sensor units 130-1, 130-3 permanently store the event data and/or audio data in the local nonvolatile storage 202 in step 414 as encrypted or plaintext event files 210, including the metadata 212, audio data 214, environmental data 215 and position information. In some examples, the control panel instructs the gunshot sensor units 130 to save only the preconfigured buffer duration (e.g. 9 seconds) of buffered audio data. In other examples, the control panel instructs the gunshot sensor units 130 to save longer periods of audio data such audio data depicting longer that 30 seconds of audio stretching from before the occurrence of the gunshot to after the gunshot.

In step 416, the control panel 116 provides audio playback of the audio data received from the gunshot sensor unit 130-2 closest to the source of the gunshots to the operator of the control panel 116 via the speakers 308. In one example, the operator might confirm the gunshots or determine, based on the audio playback, that the acoustic anomalies were not gunshots.

At this point, the control panel 116, possibly based on input received from the operator via the GUI 318, can take any number of responsive actions such as alerting law enforcement 70, initiating building security procedures, or dismissing the alerts based on determining that the acoustic anomalies were not gunshots, among other examples.

In the illustrated example, the control panel 116, in step 418, proceeds to analyze the event data, including the audio data and environmental data, for example, to confirm the gunshots, detect destructive events such as explosions from an improvised explosive device (IED) based on the environmental data, detect seismic activity such as earthquakes based on the environmental data, or generate forensic data to be later used by law enforcement 70 or other entities in investigating the event.

In step 420, the gunshot detection system 100 provides the event data, including the audio data, and any generated analytics information to law enforcement entities 70. This might include transferring the data to computing devices of the law enforcement entities 70. This data could also be transferred to remote servers, for example, of a cloud gunshot detection management system. Of note here is that in addition to the control panel 116 transferring the event data, the de-conflicted gunshot sensor units 130-1, 130-3 can also be equipped to transfer the locally stored and/or encrypted event data from the local nonvolatile storage 202 to the law enforcement entities 70, for example, via wired and/or wireless data transfer ports of the gunshot sensor units 130 in response to receiving credentials for superuser access and based on predetermined permissions settings, in examples.

Figure 4B:
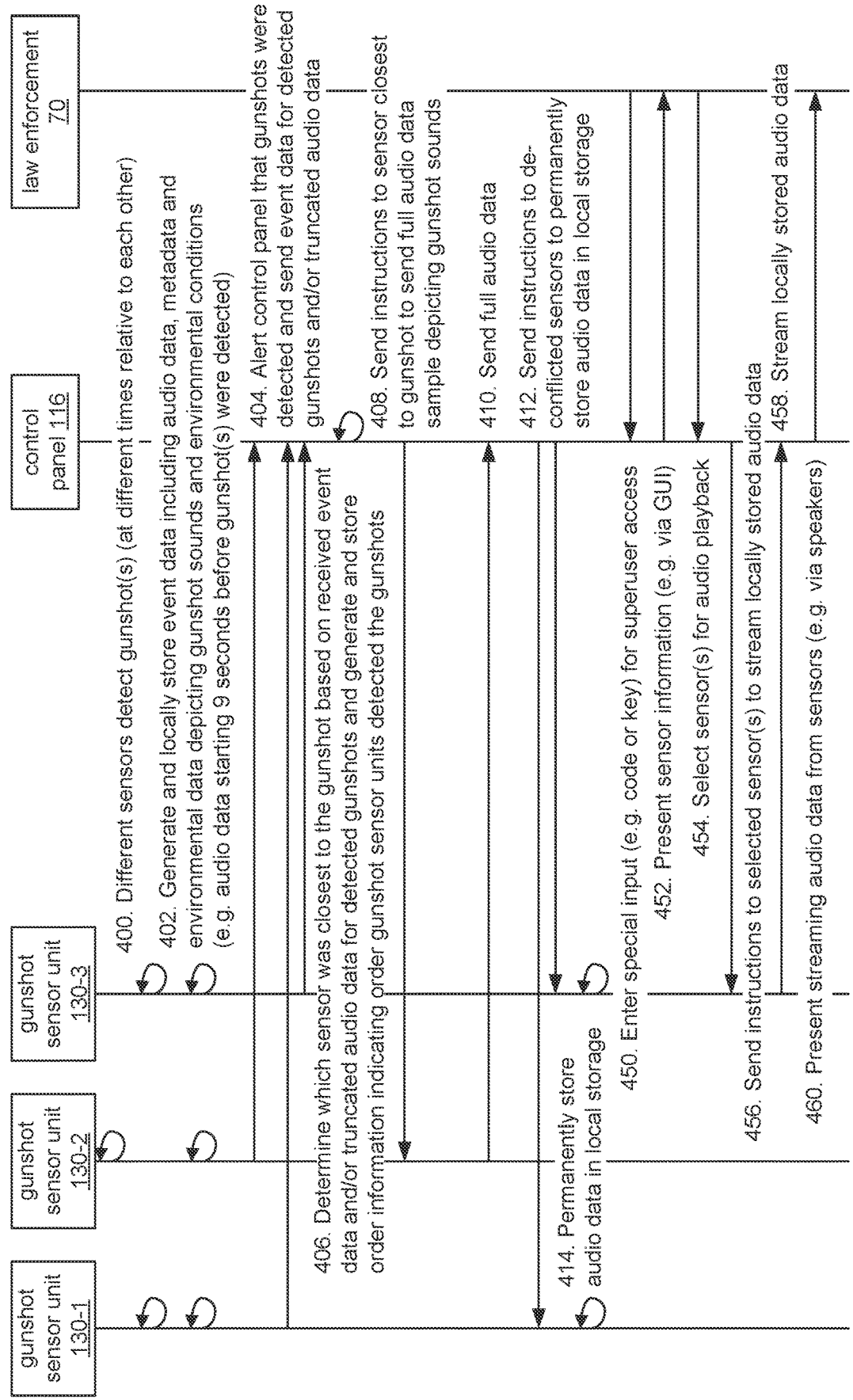
FIG. 4B is a sequence diagram illustrating an exemplary process by which the control panel retrieves locally stored event data from the gunshot sensor units.

FIG. 4B is a sequence diagram illustrating an exemplary process by which the control panel 116 retrieves locally stored event data from the gunshot sensor units 130. Specifically, in the illustrated example, the control panel 116 retrieves and presents the audio data to the operator via the speakers 308.

First, steps 400 through 414 proceed as previously described, as the gunshot sensor units 130 detect the gunshots, generate the event data, and locally store the event data in the local nonvolatile storage 202.

Then, in step 450, the control panel 116 receives, for example, from an officer of a law enforcement entity 70 a special input for superuser access. The special input might include a code or other credentials entered via the GUI 318, or possibly a key inserted into an interface of the control panel 116. The superuser access allows retrieval and/or decryption of the locally stored and/or encrypted event data from the gunshot sensor units 130 and/or the control panel 116 itself. In the preferred embodiment, superuser access is granted only in response to receiving the special input. The business entities administering the gunshot detection system 100 might have a policy for providing the superuser access to technicians, including doing so only in response to a subpoena or other official directive. The key and/or code for obtaining superuser access might even be held by a third party such as law enforcement.

In step 452, having received the special input, the control panel 116 presents to the law enforcement officer 70 gunshot sensor unit information (e.g. identification information, location information, proximity information to the source of the detected gunshots, or other information) pertaining to the different gunshot sensor units 130 of the gunshot detection system 100. In step 454, the law enforcement officer 70 selects a particular gunshot sensor unit 130 for audio playback.

In step 456, the control panel 116 sends instructions to the selected gunshot sensor unit 130-3, which in the illustrated example is one of the two de-conflicted gunshot sensor units 130-1, 130-3, to stream the locally stored audio data. The gunshot sensor unit 130-3 streams the locally stored audio data in step 458.

In step 460, the control panel 116 presents the streaming audio data from the gunshot sensor unit 130-3 to the law enforcement officer 70 via the speakers 308.

FIG. 5 is a sequence diagram illustrating an exemplary process by which the gunshot detection system 100 provides live monitoring of ambient sound in the areas 52 where the gunshot sensor units 130 are located and two-way communication between individuals in the areas 52 where the gunshot sensor units 130 are located and operators of the control panel 116 such as law enforcement officers 70 or other authorized individuals.

First, in step 502, the authorized individual such as the law enforcement officer 70 enters the special input (e.g. keys, codes, decryption keys for encrypted audio data, multi-factor authentication queries, physical tokens, biometric information generated by biometric sensors) for superuser access via the GUI 318 and/or other interfaces of the control panel 116. In step 504, the control panel 116 presents the gunshot sensor unit information to the law enforcement officer 70 via the GUI 318. This process is similar to the analogous process described in steps 450 and 452 with respect to FIG. 4B.

In step 506, the GUI 318 receives input from the law enforcement officer 70 indicating selection of a gunshot sensor unit 130 for live audio monitoring. In one example, the law enforcement office 70 might select the gunshot sensor unit 130 closest to the source of the gunshots with hopes of communicating with the shooter or victims.

In step 508, the control panel 116 generates and sends live monitoring instructions to the selected gunshot sensor unit 130-2 to stream live audio data.

In step 510, in response to receiving the live monitoring instructions, the gunshot sensor unit 130-2 captures ambient sound via the audio capture microphone 208, generates audio data depicting the ambient sound, and streams live audio data to the control panel 116 in real time. The control panel 116, in step 512, presents the streamed live audio data to the law enforcement officer 70 via the speakers 308.

In this way, the gunshot detection system 100 provides the live monitoring functionality.

In order to initiate two-way communication, in step 514, the law enforcement officer 70 selects an option for providing audio input (e.g. a "push to talk" button on the GUI 318). The GUI 318 receives the input from the law enforcement officer 70 indicating selection of the gunshot sensor unit 130 for two-way communication, and in step 516, the control panel 116 prompts the law enforcement officer 70 for audio input.

In step 518, the microphone 306 of the control panel 116 receives the audio input from the law enforcement officer 70 (e.g. captured speech sounds), and the control panel 116 generates audio data based on the audio input.

In step 520, the control panel 116 streams the audio data back to the selected gunshot sensor unit 130-2.

In step 522, the gunshot sensor unit 130-2 outputs the audio data received from the control panel 116 via the speakers 308, thus presenting the captured speech sounds from the law enforcement office 70 to any individuals in the area 52 where the gunshot sensor unit 130-2 is located.

Figure 6:
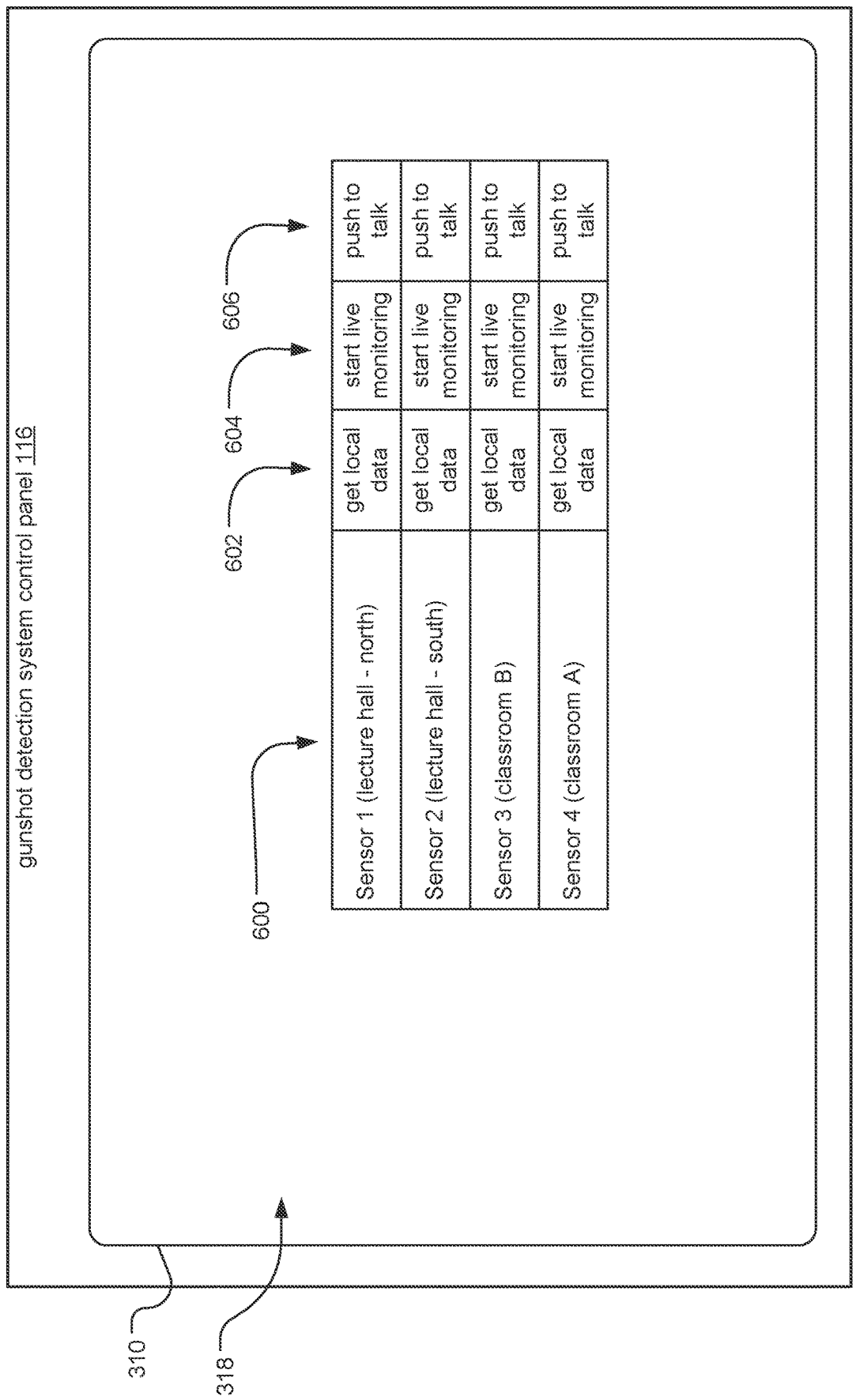
FIG. 6 is an illustration of an exemplary screen of a graphical user interface presented on a touch screen graphics display of the control panel.

FIG. 6 is an illustration of an exemplary screen of the GUI 318 presented on the display 310 of the control panel 116. This screen is displayed, for example, at steps 452 and 504, which were previously described with respect to FIGS. 4B and 5 respectively. In general, the screen includes graphical elements 600, 602, 604, 606 such as indicators for presenting information and/or virtual buttons for receiving user input. In particular, the gunshot sensor unit information indicators 600 present the gunshot sensor unit information for different gunshot sensor units 130. Virtual buttons 602, 604, 606 are associated with each of the gunshot sensor unit information indicators 600. Of these, the get local data button 602 provides an option for retrieving the event data and/or audio data locally stored on the gunshot sensor units 130, the live monitoring button 604 provides an option for live monitoring of ambient sound captured by the gunshot sensor units 130, and the push to talk button 606 provides an option for two-way communication between the control panel 116 and the gunshot sensor unit 130.

Figure 7:
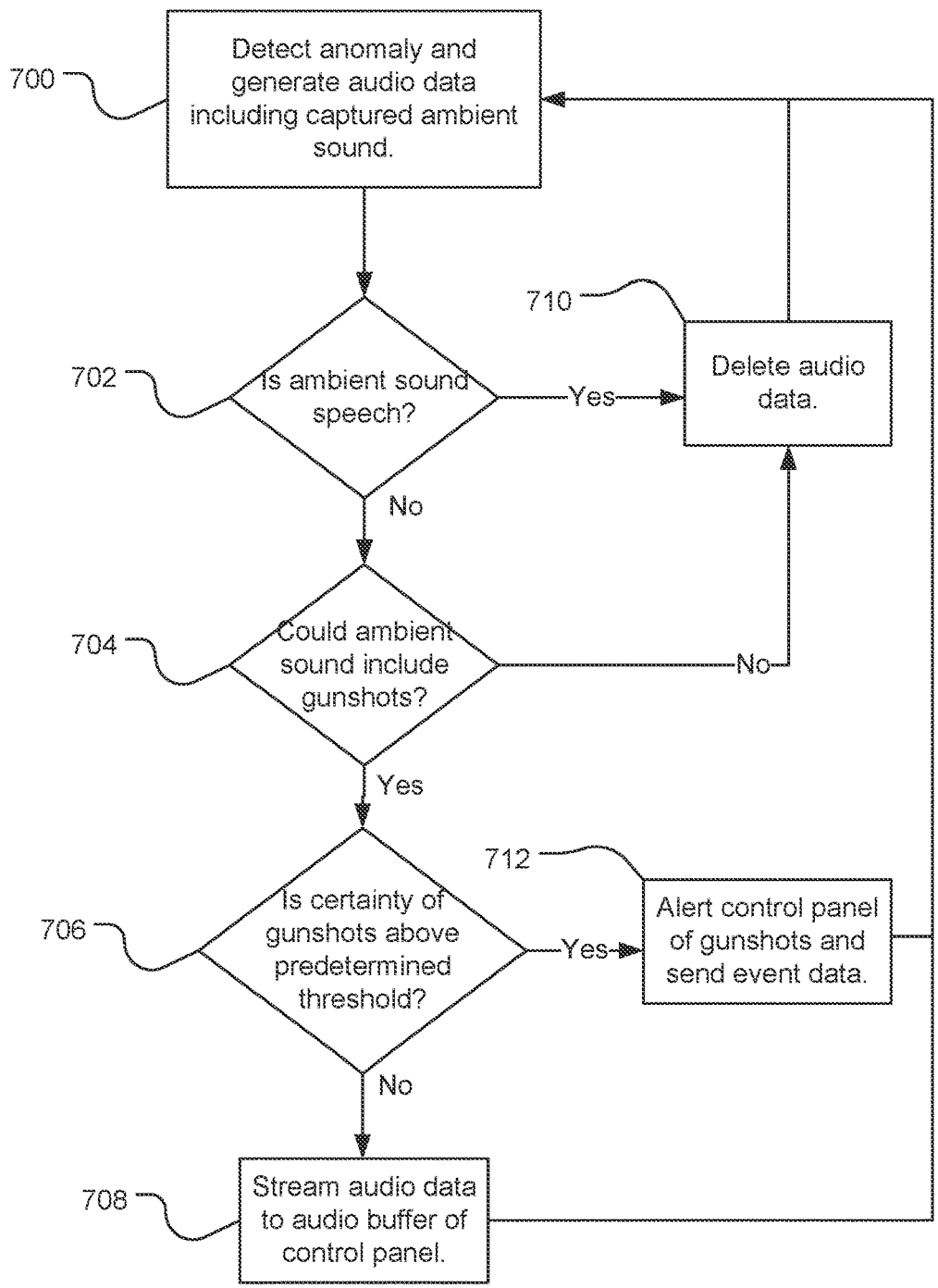
FIG. 7 is a flow diagram illustrating functionality of the gunshot sensor unit during an operation in which anomalies are detected across both the individual gunshot sensor units and the control panel.
Figure 8:
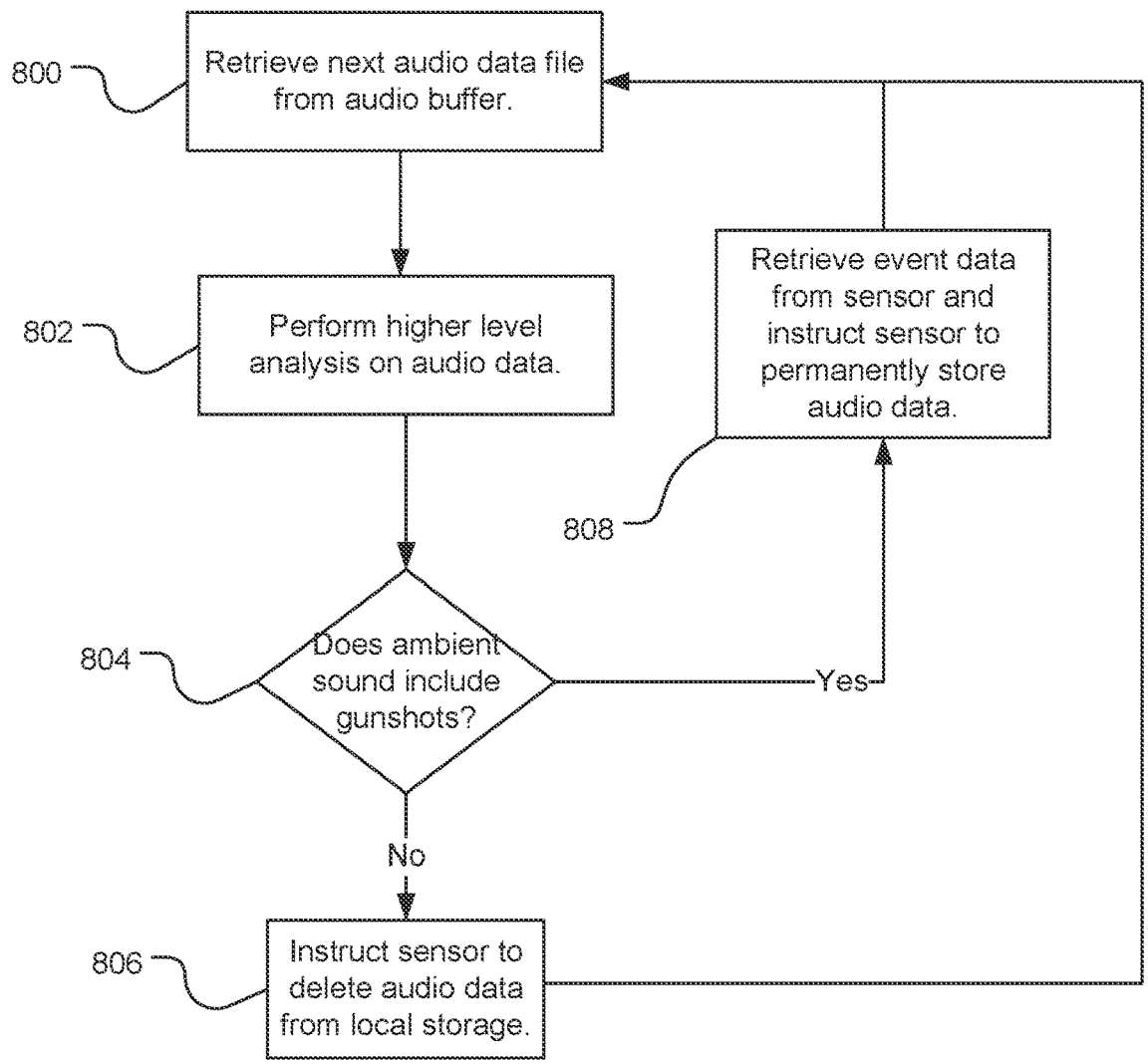
FIG. 8 is a flow diagram illustrating functionality of the control panel during an operation in which anomalies are detected across both the individual gunshot sensor units and the control panel.

FIGS. 7 and 8 are flow diagrams illustrating an operation in which anomalies are detected across both the individual gunshot sensor units 130 and the control panel 116.

FIG. 7 shows the operation of the gunshot sensor unit 130.

In step 700, the gunshot sensor unit 130 detects an acoustic anomaly via the anomaly detection microphone 206 and generates audio data depicting ambient sound including the acoustic anomaly.

In step 702, the gunshot sensor unit 130 determines whether the ambient sound depicted in the audio data is in fact speech sounds. If so, in step 710, the gunshot sensor unit 130 deletes the audio data and returns to step 700.

If the ambient sound does not include speech sounds, however, in step 704, the gunshot sensor unit 130 determines whether the captured ambient sound might include gunshots. If not, the gunshot sensor unit 130 deletes the audio data as previously described in step 710 and returns to step 700.

However, in step 706, if the ambient sound could include gunshots, the gunshot sensor unit 130 determines whether a certainty of the ambient sound including gunshots is above a predetermined threshold. If so, in step 712, the gunshot sensor unit 130 alerts the control panel 16 of gunshots, sends the event data to the control panel 116 and then returns to step 700.

The processes for evaluating whether the ambient sound could include gunshots in steps 704 and/or 706 might include analyzing the sensor data generated by the sensors of the environmental board 220. In one example, the gunshot sensor unit 130 isolates a loud acoustic signature in the audio data that could be a gunshot and determines whether the sensor data indicates that the presence of gases indicative of the discharge of a weapon such as carbon monoxide (CO) and ammonia ($NH_3$) and/or smoke and other airborne particles were detected by the gas detector 229 and the smoke sensor 231 shortly after the occurrence of the acoustic anomaly.

In step 708, if the certainty of the ambient sound including gunshots is not above a predetermined threshold, the gunshot sensor unit 130 streams the audio data to the control panel 116 to be stored in the FIFO audio buffer 320. At this point, the gunshot sensor unit 130 returns to step 700.

The gunshot detection operation is then resumed by the control panel 116, as shown in FIG. 8.

In step 800, the control panel 116 retrieves the next audio data file from its FIFO audio buffer 320.

In step 802, the control panel 116 performs a higher level analysis on the audio data, which might not be possible for the gunshot sensor units 130 to perform due to limited processing capability, for example. In some example, the control panel employs a machine learning algorithm that compares the audio data to learned gunshot sounds to identify less common sounds such as gunshots from a suppressed gun and gunshots from subsonic ammunition.

In step 804, the control panel 116 confirms whether or not the ambient sound includes gunshots. If so, in step 808, the control panel 116 retrieves the event data from the gunshot sensor unit 130 and instructs the gunshot sensor unit 130 to permanently store the event data and/or audio data in local nonvolatile storage 202.

In step 806, if the ambient sound is determined by the control panel 116 to not include gunshots, the control panel 116 instructs the gunshot sensor unit 130 to delete the event data and/or audio data from its local nonvolatile storage 202.

In either case, the control panel 116 returns to step 800 and repeats the process with the next audio file.

Figure 9A:
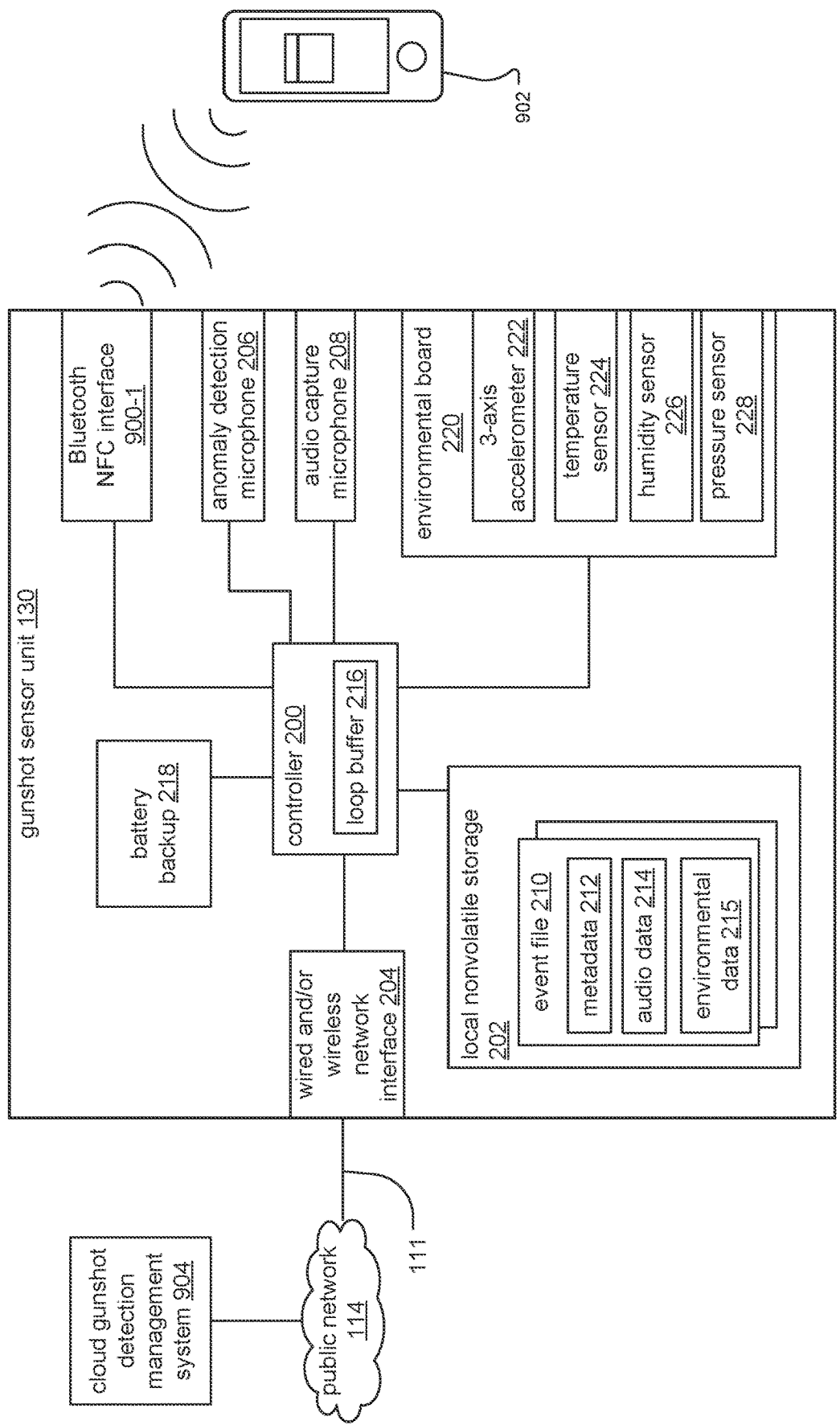
FIG. 9A is a block diagram showing an exemplary embodiment of the gunshot sensor unit, in which the gunshot sensor unit includes a wireless data transfer interface.
Figure 9B:
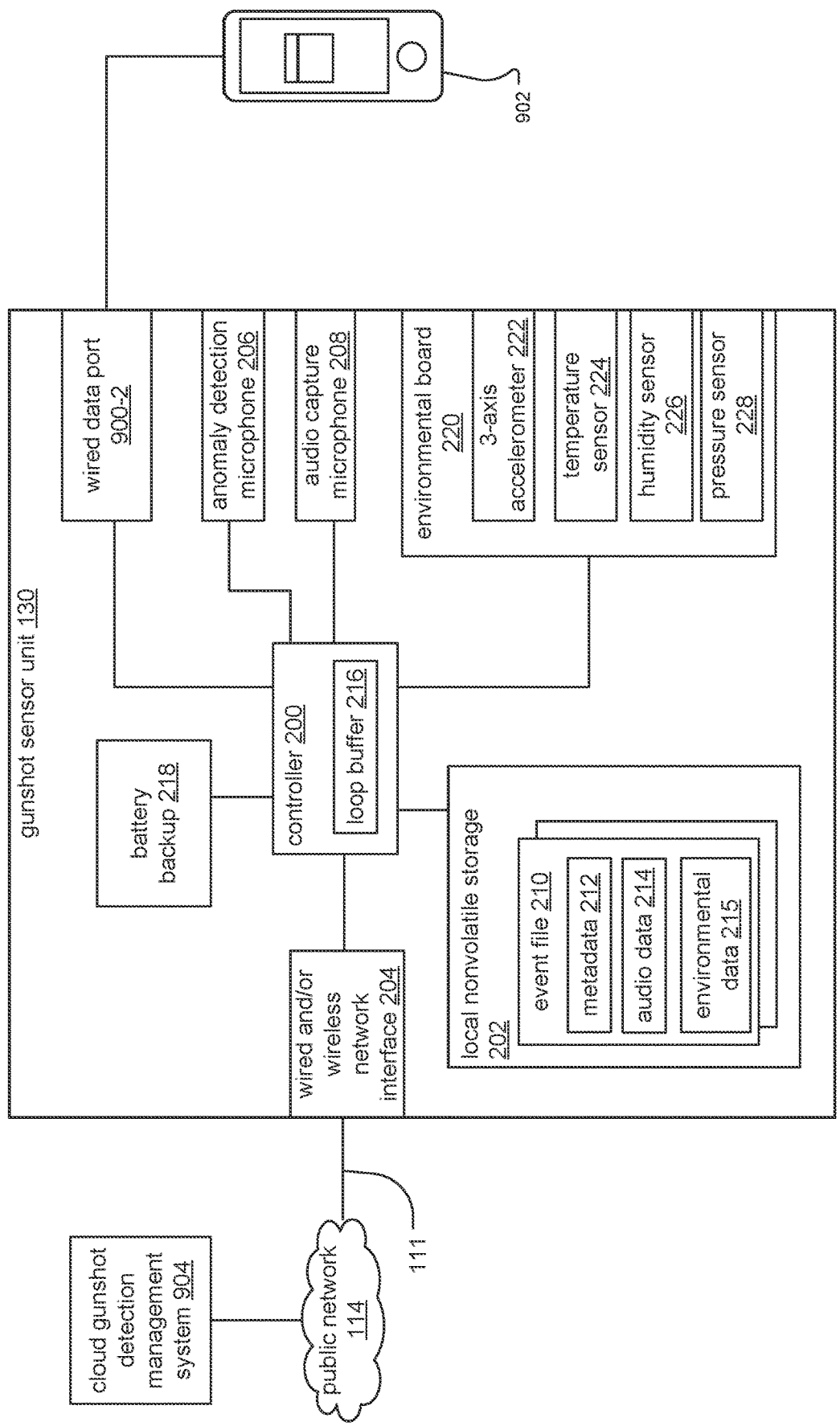
FIG. 9B is a block diagram showing an exemplary embodiment of the gunshot sensor unit, in which the gunshot sensor unit includes a wired data transfer interface.

FIGS. 9A and 9B are block diagrams showing an exemplary embodiment of the gunshot sensor unit 130, in which the gunshot sensor unit 130 includes a data transfer interface 900 for transferring the locally stored event data 210 to computing devices of law enforcement entities such as handheld units 902 or other mobile computing devices. In both examples, the gunshot sensor unit 130 also connects to a cloud gunshot detection management system 904, which might be a remote server operated by law enforcement 70 or other entities. The gunshot sensor unit 130 transfers the event data 210 to the cloud gunshot detection management system 904 via the wired and/or wireless network interface 204, the communication network 111, and a public network 114 such as the internet to which the cloud gunshot detection management system 904 and the communication network 111 are both connected.

In particular, the illustrated example of FIG. 9A shows a Bluetooth and/or near field communication (NFC) interface 900-1, through which the gunshot sensor unit 130 wirelessly transmits the event data 210 to the law enforcement handheld unit 902.

The illustrated example depicted in FIG. 9B, on the other hand, shows a wired data transfer interface 900-2, through which the gunshot sensor unit 130 transmits the event data 210 to the law enforcement handheld unit 902.

Figure 10:
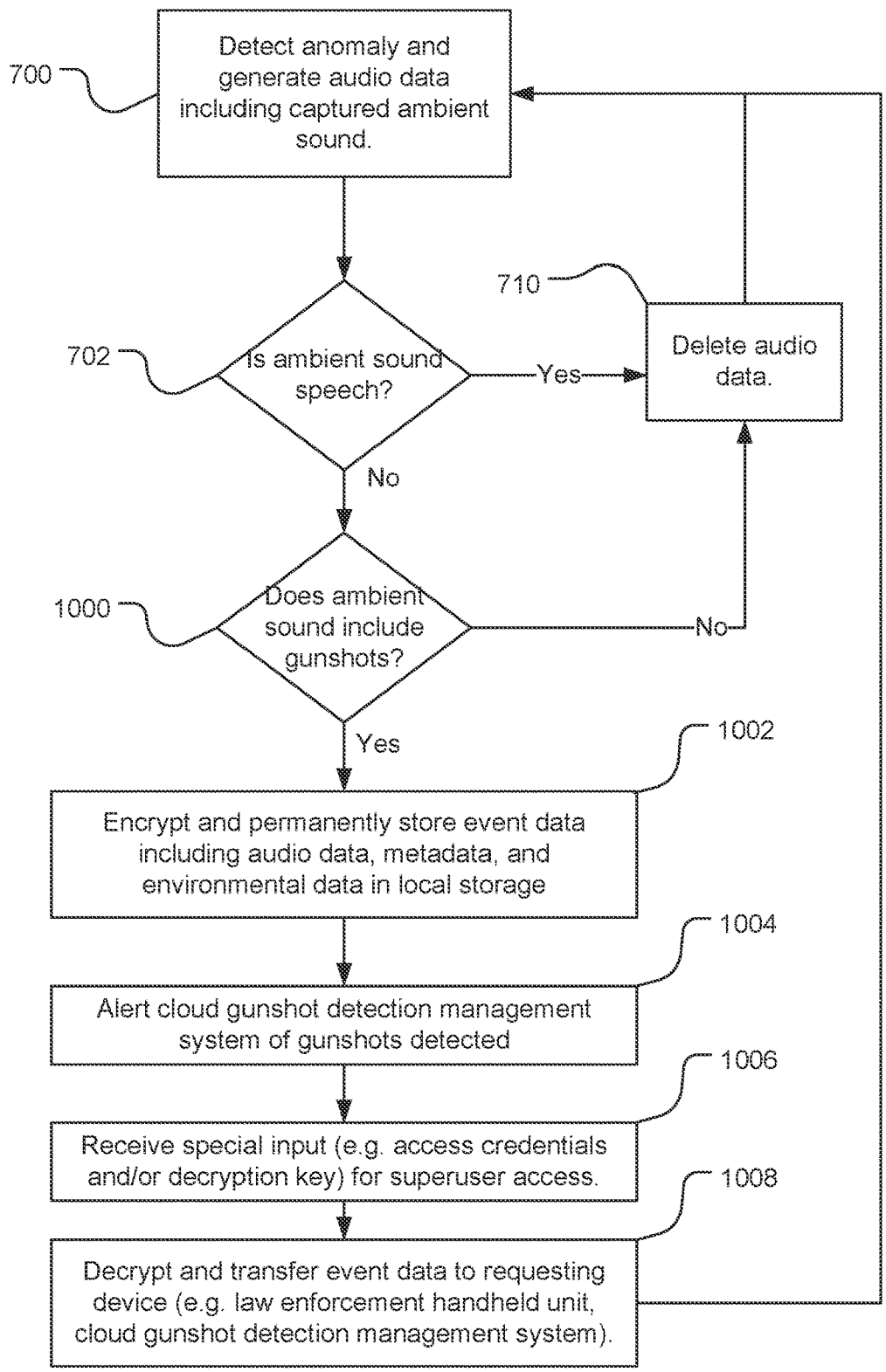
FIG. 10 is a flow diagram illustrating an exemplary process by which the gunshot sensor unit autonomously performs the gunshot detection functions without a control panel.

FIG. 10 is a flow diagram illustrating an exemplary process by which the gunshot sensor unit 130 autonomously performs the gunshot detection functions without a control panel 116. In this example, the gunshot detection system 100 may not include a control panel 116 (e.g. for a small business entity at a smaller premises 50), or the control panel 116 may be disabled or disconnected from the communication network 111.

Steps 700 through 702 proceed as previously described, as the gunshot sensor unit 130 generates the audio data, determines whether the ambient sound depicted in the audio data is speech, and deletes the audio if so in step 710.

Now, however, the gunshot sensor unit 130 autonomously determines whether the ambient sound includes gunshots in step 1000. If not, the gunshot sensor unit 130 deletes the audio data in step 710 and returns to step 700.

If the ambient sound does include gunshots, however, in step 1002, the gunshot sensor unit 130 encrypts and permanently stores the event data including the audio data, metadata and environmental data in local storage 202.

In step 1004, the gunshot sensor unit alerts the cloud gunshot detection management system 904 that gunshots were detected.

In step 1006, the gunshot sensor unit receives the special input for superuser access (e.g. code or other credentials, key, decryption key), and in step 1008, the gunshot sensor unit decrypts and transfers the locally stored event data 210 to a requesting device such as the law enforcement handheld unit 902 or the cloud gunshot detection management system 904.

In this way, the gunshot sensor units 130 perform the gunshot detection functionality of the gunshot detection system autonomously without direction or participation of a control panel 116.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for detecting gunshots within a premises, the system comprising:
gunshot sensor units for detecting the gunshots, the gunshot sensor units comprising one or more microphones for detecting acoustic anomalies indicating potential gunshots and for generating audio data depicting the acoustic anomalies, and controllers for generating event data based on the detected acoustic anomalies; and
a control panel for receiving the event data and the audio data from the gunshot sensor units, the control panel comprising speakers for providing audio playback of the audio data received from the gunshot sensor units;
wherein the gunshot sensor units further comprise nonvolatile storage for locally storing the audio data and event data, and the control panel provides audio playback of audio data locally stored by the gunshot sensor units and streamed to the control panel; and
wherein the control panel further comprises a graphical user interface (GUI) for providing sensor information to an operator of the control panel and for receiving input from the operator indicating selections of different gunshot sensor units for retrieval of locally stored audio data and event data, and, in response to selection of a particular gunshot sensor unit by the operator via the GUI, the control panel sends instructions to the selected gunshot sensor unit to stream audio data that is locally stored on nonvolatile memory of the selected gunshot sensor unit, and, in response to the instructions, the selected gunshot sensor unit streams the locally stored audio data to the control panel.

2. A system for detecting gunshots within a premises, the system comprising:
gunshot sensor units for detecting the gunshots, the gunshot sensor units comprising one or more microphones for detecting acoustic anomalies indicating potential gunshots and for generating audio data depicting the acoustic anomalies, and controllers for generating event data based on the detected acoustic anomalies; and
a control panel for receiving the event data and the audio data from the gunshot sensor units, the control panel comprising speakers for providing audio playback of the audio data received from the gunshot sensor units; and
wherein the control panel generates and sends live monitoring instructions to the gunshot sensor units, the gunshot sensor units generate and stream live audio data depicting ambient sound to the control panel in response to the live monitoring instructions, and the control panel provides audio playback of the streamed live audio data depicting the ambient sound; and
wherein the control panel further comprises a graphical user interface (GUI) for providing sensor information to an operator of the control panel and for receiving input from the operator indicating selections of different gunshot sensor units for live audio data streaming from the gunshot sensor units, and, in response to selection of a particular gunshot sensor unit by the operator via the GUI, the control panel generates and sends the live monitoring instructions to the selected gunshot sensor unit.

3. The system of claim 2, wherein the gunshot sensor units further comprise nonvolatile storage for locally storing the audio data and event data, and the control panel provides audio playback of audio data locally stored by the gunshot sensor units and streamed to the control panel.

4. The system of claim 2, wherein the control panel further comprises a microphone for generating audio data that is live streamed to the gunshot sensor units, and the gunshot sensor units further comprise speakers for providing audio playback of the live audio data streamed from the control panel, and the control panel provides two-way communication between individuals in an area where a gunshot sensor unit is located and an operator of the control panel by generating audio data based on speech sounds from the operator captured by the microphone of the control panel and streaming back to the gunshot sensor units the audio data generated based on the captured speech sound from the operator.

5. The system of claim 4, wherein the control panel further comprises a graphical user interface (GUI) for providing sensor information to an operator of the control panel and for receiving input from the operator indicating selections of different gunshot sensor units for two-way communication between the control panel and the selected gunshot sensor unit, and, in response to selection of a particular gunshot sensor unit by the operator via the GUI, the control panel prompts the operator for audio input, receives from the operator via the microphone of the control panel audio input including captured speech sounds, generates audio data based on the received audio input, and streams the generated audio data back to the selected gunshot sensor unit, which presents the captured speech sounds from the operator to any individuals in an area where the selected gunshot sensor unit is located via the speakers of the selected gunshot sensor unit.

6. A system for detecting gunshots within a premises, the system comprising:
gunshot sensor units for detecting the gunshots, the gunshot sensor units comprising one or more microphones for detecting acoustic anomalies indicating potential gunshots and for generating audio data depicting the acoustic anomalies, and controllers for generating event data based on the detected acoustic anomalies; and
a control panel for receiving the event data and the audio data from the gunshot sensor units, the control panel comprising speakers for providing audio playback of the audio data received from the gunshot sensor units; and
wherein the gunshot sensor units further comprise nonvolatile storage for locally storing the audio data and event data, and the control panel further comprises a microphone for generating audio data and a graphical user interface (GUI) for providing sensor information to an operator of the control panel and for receiving input from the operator indicating selections of different gunshot sensor units for retrieval of locally stored audio data and event data, live audio data streaming from the gunshot sensor units, and/or two-way communication between the control panel and the gunshot sensor units.

7. The system of claim 6, wherein the sensor information includes identification information, location information, and/or proximity information to a source of the detected acoustic anomalies.

8. A method for detecting gunshots within a premises, the method comprising:
detecting acoustic anomalies indicating potential gunshots and generating audio data depicting the acoustic anomalies via one or more microphones of gunshot sensor units;
generating event data based on the detected acoustic anomalies;
providing audio playback of the audio data received from the gunshot sensor units via speakers of a control panel for receiving the event data and the audio data; and
via a graphical user interface (GUI) of the control panel, providing sensor information to an operator of the control panel and receiving input from the operator indicating selections of different gunshot sensor units for retrieval of locally stored audio data and event data, and, in response to selection of a particular gunshot sensor unit by the operator via the GUI, sending instructions to the selected gunshot sensor unit to stream audio data that is locally stored on nonvolatile memory of the selected gunshot sensor unit, and, in response to the instructions, the selected gunshot sensor unit streaming the locally stored audio data to the control panel.

9. A method for detecting gunshots within a premises, the method comprising:
detecting acoustic anomalies indicating potential gunshots and generating audio data depicting the acoustic anomalies via one or more microphones of gunshot sensor units;
generating event data based on the detected acoustic anomalies;
providing audio playback of the audio data received from the gunshot sensor units via speakers of a control panel for receiving the event data and the audio data;
generating and sending live monitoring instructions to the gunshot sensor units, the gunshot sensor units generating and streaming live audio data depicting ambient sound to the control panel in response to the live monitoring instructions, and the control panel providing audio playback of the streamed live audio data depicting the ambient sound; and
via a graphical user interface (GUI) of the control panel, providing sensor information to an operator of the control panel and receiving input from the operator indicating selections of different gunshot sensor units for live audio data streaming from the gunshot sensor units, and, in response to selection of a particular gunshot sensor unit by the operator via the GUI, generating and sending the live monitoring instructions to the selected gunshot sensor unit.

10. The method of claim 9, further comprising locally storing the audio data and event data in nonvolatile storage of the gunshot sensor units, and the control panel providing audio playback of audio data locally stored by the gunshot sensor units and streamed to the control panel.

11. The method of claim 9, further comprising providing two-way communication between individuals in an area where a gunshot sensor unit is located and an operator of the control panel by generating live audio data based on speech sounds from the operator captured by a microphone of the control panel and streaming back to the gunshot sensor units the audio data generated based on the captured speech sound from the operator, and the gunshot sensor units, via speakers of the gunshot sensor units, providing audio playback of the live audio data streamed from the control panel.

12. The method of claim 11, further comprising, via a graphical user interface (GUI) of the control panel, providing sensor information to an operator of the control panel and receiving input from the operator indicating selections of different gunshot sensor units for two-way communication between the control panel and the selected gunshot sensor unit, and, in response to selection of a particular gunshot sensor unit by the operator via the GUI, prompting the operator for audio input, receiving from the operator via the microphone of the control panel audio input including captured speech sounds, generating audio data based on the received audio input, streaming the generated audio data back to the selected gunshot sensor unit, and the selected gunshot sensor unit presenting the captured speech sounds from the operator to any individuals in an area where the selected gunshot sensor unit is located via the speakers of the selected gunshot sensor unit.

13. A method for detecting gunshots within a premises, the method comprising:
detecting acoustic anomalies indicating potential gunshots and generating audio data depicting the acoustic anomalies via one or more microphones of gunshot sensor units;
generating event data based on the detected acoustic anomalies;
providing audio playback of the audio data received from the gunshot sensor units via speakers of a control panel for receiving the event data and the audio data; and
locally storing the audio data and event data in nonvolatile storage of the gunshot sensor units and providing sensor information to an operator of a control panel and receiving input from the operator via a graphical user interface (GUI), the received input indicating selections of different gunshot sensor units for retrieval of the locally stored audio data and event data, live audio data streaming from the gunshot sensor units, and/or two-way communication between a control panel and the gunshot sensor units via a microphone for generating audio data and speakers for providing audio playback of audio data of the control panel.

14. The system of claim 13, wherein the sensor information includes identification information, location information, and/or proximity information to a source of the detected acoustic anomalies.

15. A system for detecting gunshots within a premises, the system comprising:
   gunshot sensor units for detecting the gunshots, the gunshot sensor units comprising one or more microphones for detecting acoustic anomalies indicating potential gunshots and for generating audio data depicting the acoustic anomalies and controllers for generating event data based on the detected acoustic anomalies; and
   a control panel for receiving the audio data and/or the event data from the gunshot sensor units and for generating and sending live monitoring instructions to the gunshot sensor units,
   wherein the gunshot sensor units generate and stream live audio data depicting ambient sound to the control panel in response to the live monitoring instructions and wherein the control panel further comprises a microphone for generating audio data that is live streamed to the gunshot sensor units, and the gunshot sensor units further comprise speakers for providing audio playback of the live audio data streamed from the control panel.

16. The system of claim 15, wherein the control panel further includes a user interface for receiving a special authorization input for super-user access from an operator of the control panel, and the control panel generates and sends the live monitoring instructions only in response to receiving the special authorization input.

17. A method for detecting gunshots within a premises, the method comprising:
   detecting acoustic anomalies indicating potential gunshots and generating audio data depicting the acoustic anomalies via one or more microphones of gunshot sensor units;
   generating event data based on the detected acoustic anomalies;
   generating and sending live monitoring instructions to the gunshot sensor units, wherein the gunshot sensor units generate and stream live audio data depicting ambient sound to a control panel in response to the live monitoring instructions and wherein the control panel further comprises a microphone for generating audio data that is live streamed to the gunshot sensor units, and the gunshot sensor units further comprise speakers for providing audio playback of the live audio data streamed from the control panel.

* * * * *